(12) United States Patent
Niu et al.

(10) Patent No.: US 12,052,728 B2
(45) Date of Patent: Jul. 30, 2024

(54) SYSTEMS AND METHODS OF TRIGGERING ACTIVE MODE UE POWER SAVING

(71) Applicant: APPLE INC., Cupertino, CA (US)

(72) Inventors: Huaning Niu, Cupertino, CA (US); Chunxuan Ye, San Diego, CA (US); Dawei Zhang, Cupertino, CA (US); Haitong Sun, Cupertino, CA (US); Hong He, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 347 days.

(21) Appl. No.: 17/593,549

(22) PCT Filed: Oct. 15, 2020

(86) PCT No.: PCT/CN2020/121280
§ 371 (c)(1),
(2) Date: Sep. 20, 2021

(87) PCT Pub. No.: WO2022/077381
PCT Pub. Date: Apr. 21, 2022

(65) Prior Publication Data
US 2022/0312463 A1     Sep. 29, 2022

(51) Int. Cl.
*H04W 72/23*     (2023.01)
*H04L 5/00*      (2006.01)
(Continued)

(52) U.S. Cl.
CPC .......... *H04W 72/23* (2023.01); *H04L 5/0053* (2013.01); *H04W 24/08* (2013.01); *H04W 72/0446* (2013.01); *H04W 76/28* (2018.02)

(58) Field of Classification Search
None
See application file for complete search history.

(56) References Cited

U.S. PATENT DOCUMENTS

2020/0029315 A1* 1/2020 Lin .................. H04W 24/08
2020/0314811 A1* 10/2020 Lin .................. H04L 5/0094
(Continued)

FOREIGN PATENT DOCUMENTS

CN     110268755 A     9/2019
CN     111385819 A     7/2020
(Continued)

OTHER PUBLICATIONS

Interdigital, Inc., "PDCCH-based power saving signal design considerations", R1-2006548, 3GPP TSG RAN WG1 #102-e, Agenda Item 8.7.2, Aug. 17-28, 2020, 4 pages.
(Continued)

*Primary Examiner* — Jamaal Henson
(74) *Attorney, Agent, or Firm* — Dorsey & Whitney LLP

(57) ABSTRACT

Embodiments herein describe systems, apparatuses, and methods for adapting physical downlink control channel (PDCCH) monitoring behaviors. In some embodiments, a network node and a UE use search space set group switching to change PDCCH monitoring behavior. In some embodiments, a network node and a UE use PDCCH skipping to change PDCCH monitoring behavior. The PDCCH monitoring behavior may be indicated in a downlink control indicator (DCI).

15 Claims, 22 Drawing Sheets

(51) Int. Cl.
    *H04W 24/08*     (2009.01)
    *H04W 72/0446*     (2023.01)
    *H04W 76/28*     (2018.01)

(56) References Cited

U.S. PATENT DOCUMENTS

| | | | |
|---|---|---|---|
| 2020/0389874 A1* | 12/2020 | Lin | H04L 5/0053 |
| 2021/0120579 A1* | 4/2021 | Park | H04L 5/0044 |
| 2021/0314126 A1* | 10/2021 | Bae | H04L 1/1819 |
| 2021/0314862 A1* | 10/2021 | Xu | H04W 76/28 |
| 2022/0039008 A1* | 2/2022 | Nimbalker | H04W 52/02 |
| 2022/0060985 A1* | 2/2022 | Xu | H04L 5/0053 |
| 2022/0086761 A1* | 3/2022 | Maleki | H04W 52/0216 |
| 2022/0182936 A1* | 6/2022 | Maleki | H04W 52/0235 |
| 2022/0191789 A1* | 6/2022 | Reial | H04W 48/12 |
| 2023/0131188 A1* | 4/2023 | Hu | H04B 7/06964 370/329 |

FOREIGN PATENT DOCUMENTS

| | | |
|---|---|---|
| EP | 3681206 A1 | 7/2020 |
| EP | 3681207 A1 | 7/2020 |
| WO | 2019035701 A1 | 2/2019 |
| WO | 2020135181 A1 | 7/2020 |

OTHER PUBLICATIONS

WIPO, International Search Report and Written Opinion, PCT/CN2020/121280, Jul. 15, 2021, 9 pages.

VIVO, "DCI-based mechanism in skipping PDCCH monitoring and switching PDCCH monitoring periodicity", R2-1905956 (Revision of R2-1903200), 3GPP TSG-RAN WG2 Meeting #106, Reno, Nevada, Agenda Item 11.11.4.2, May 13-17, 2019, 5 pages.

\* cited by examiner

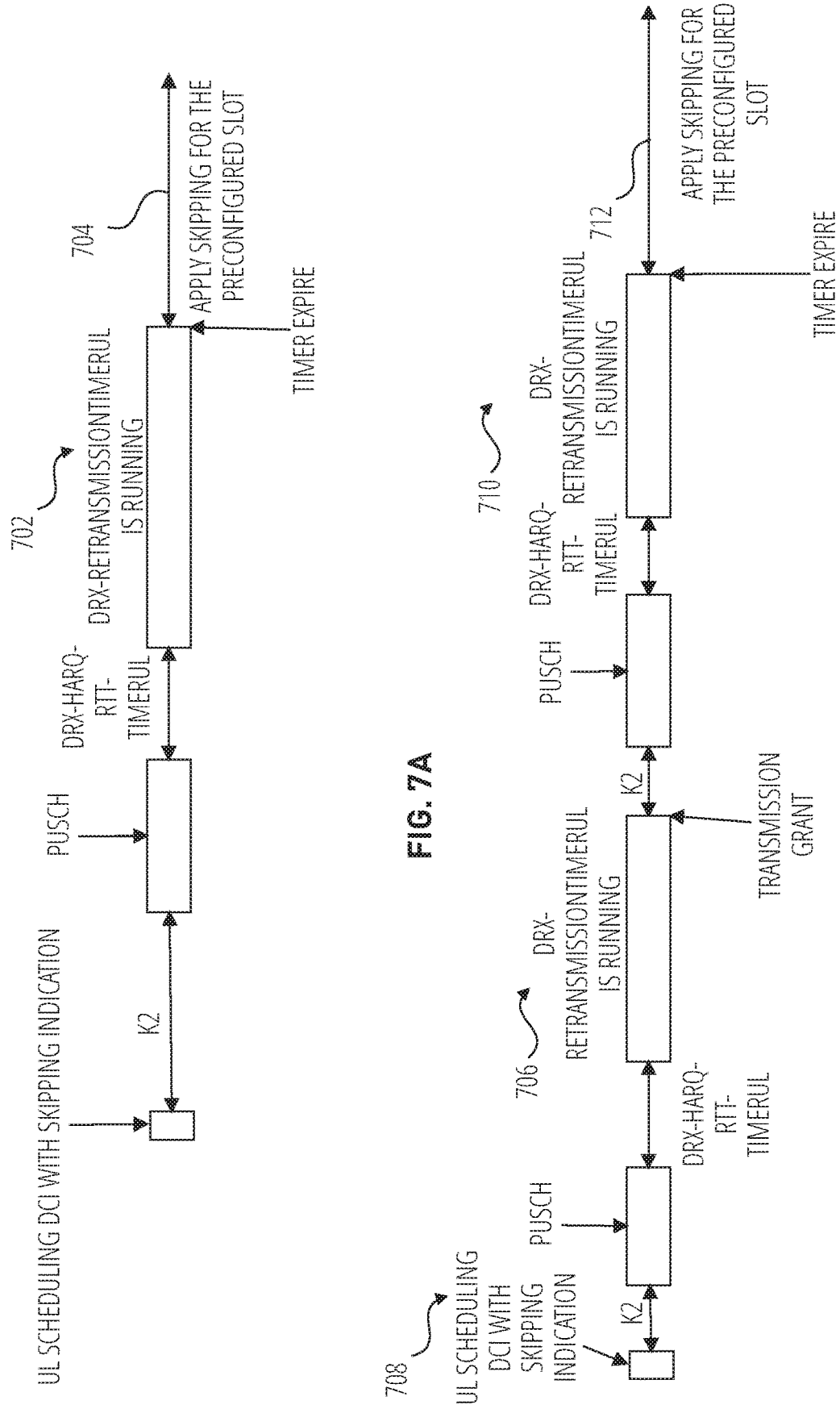

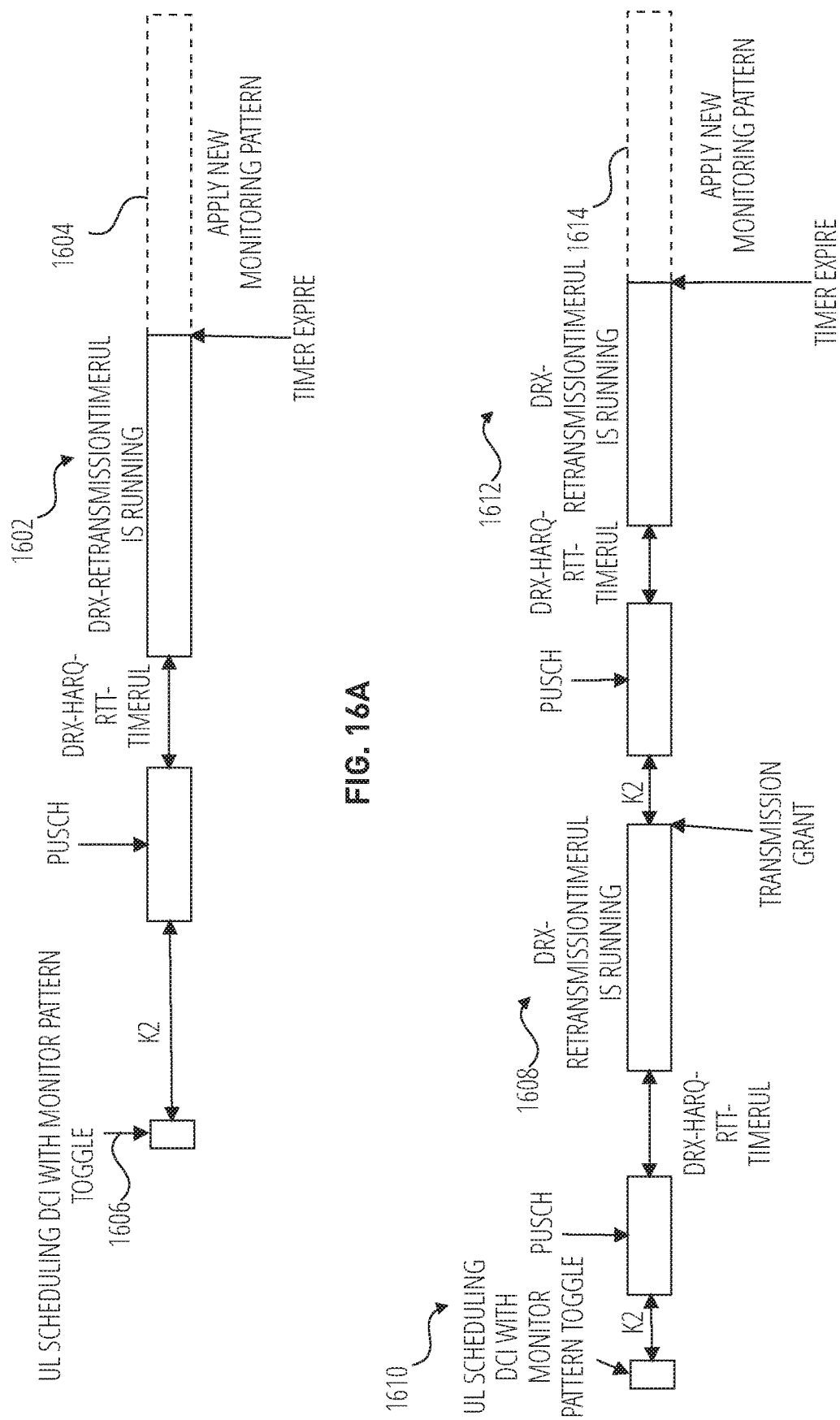

SYSTEMS AND METHODS OF TRIGGERING ACTIVE MODE UE POWER SAVING

TECHNICAL FIELD

This application relates generally to wireless communication systems, including applying PDCCH skipping and search space set group switching.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7A illustrates applying the PDCCH monitoring skipping after a drx-retransmissionTimerUL expires when the uplink timeline includes an ACK message according to some embodiments FIG. 7B illustrates applying PDCCH monitoring skipping after a drx-retransmissionTimerUL timer expires when the uplink timeline includes a NACK message according to some embodiments.

FIG. 16A illustrates a third timing option of when to apply the search space/coreset change during an uplink timeline in accordance with one embodiment.

FIG. 16B illustrate a third timing option of when to apply the search space/coreset change during an uplink timeline when a NACK message is transmitted in accordance with one embodiment.

DETAILED DESCRIPTION

One goal in network communications is to reduce power consumption of a user equipment (UE). The power savings techniques used often are balanced to minimize system performance impacts. One method that may be employed to enhance power saving for a UE is to reduce or alter monitoring periods for the UE.

Embodiments herein describe systems, apparatuses, and methods for adapting physical downlink control channel (PDCCH) monitoring behaviors to reduce power consumption of a UE. In some embodiments, a network node and a UE use search space set group switching to change PDCCH monitoring behavior. In some embodiments, a network node and a UE use PDCCH skipping to change PDCCH monitoring behavior. For example, the network node may indicate to the UE to monitor PDCCH or to skip monitoring PDCCH. Further, the network node may indicate to the UE to toggle the PDCCH monitoring pattern or make a search space/Coreset change.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
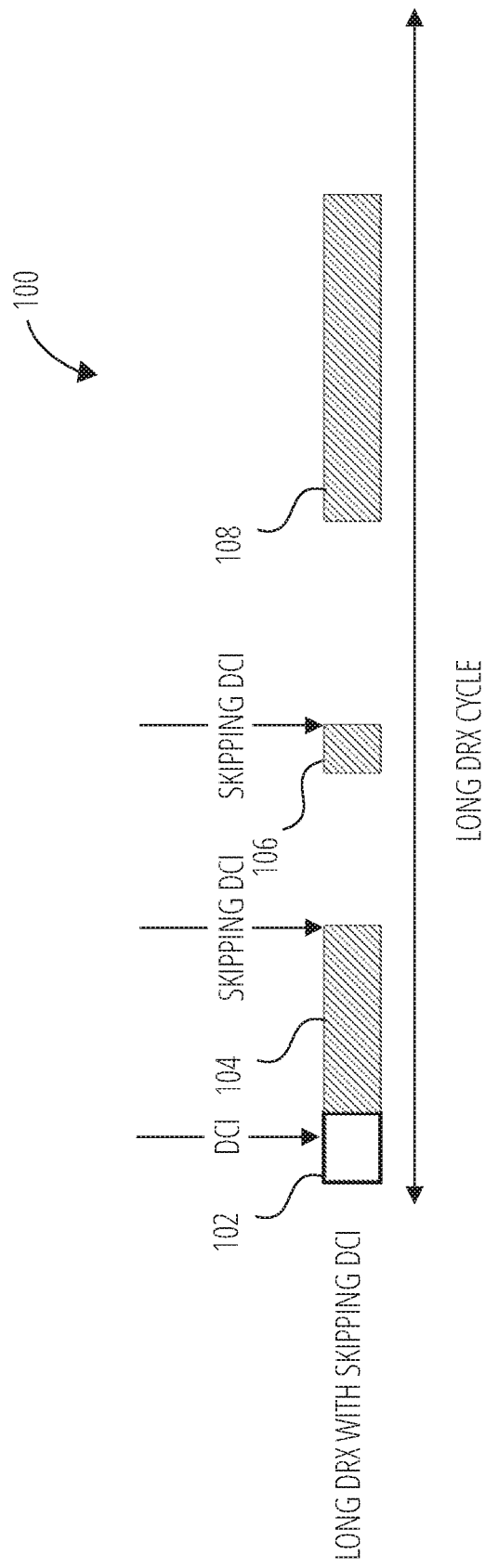
FIG. 1 illustrates UE monitoring behavior implementing a skipping downlink control indicator (DCI) during a long discontinuous reception (DRX) cycle in accordance with one embodiment.

FIG. 1 illustrates UE monitoring behavior implementing a skipping downlink control indicator (DCI) during a long discontinuous reception (DRX) cycle 100. The skipping DCI allows the UE to not monitor certain periods of the long DRX cycle 100. By not monitoring the entire time, a UE may reduce power consumption.

In the illustrated embodiment, during a first time period 102 there is downlink or uplink traffic. During this period, the UE may receive a DCI. The DCI may indicate to the UE to implement skipping in the monitoring behavior of the UE. The network node (e.g., a gNB) may send notice via the DCI to the UE to implement skipping for a few slots and then return back to monitoring. For example, during the second time period 104 there is no traffic in downlink or uplink communication channels. The UE performs skipping and stops monitoring until the third time period 106. Then after monitoring another period of inactivity, the UE may perform skipping again until the fourth time period 108. The skipping behavior may continue throughout the long DRX cycle 100.

A skipping value may indicate how long the skipping periods should be and when the skipping should be performed. The skipping value can be Radio Resource Control (RRC) configured. In some embodiments, a scheduling DCI may provide a timeline to apply the skipping after receiving a DCI indicating skipping. For example, in some embodiments, the network node may send the DCI with skipping indication together with a last transmission block for downlink/uplink transmission. The skipping indication may comprise one or two bits added to the scheduling DCI. Additionally, a non-scheduling DCI or timer may be used to implement skipping DCI during periods when there is no traffic to schedule.

The skipping value may be related to the DRX cycle and timer values. For example, skipping may be applied based on the status of certain timers, such as timers used for Hybrid Automatic Repeat Request (HARQ) processes. The HARQ processes timers may include:

drx-HARQ-RTT-TimerDL (per DL HARQ process except for the broadcast process): representing the minimum duration before a DL assignment for HARQ retransmission is expected by the MAC entity;

drx-HARQ-RTT-TimerUL (per UL HARQ process): representing the minimum duration before a UL HARQ retransmission grant is expected by the MAC entity.

drx-RetransmissionTimerDL (per DL HARQ process except for the broadcast process): representing the maximum duration until a DL retransmission is received;

drx-RetransmissionTimerUL (per UL HARQ process): representing the maximum duration until a grant for UL retransmission is received;

The Active Time (the time in which the UE should be monitoring) includes the time while: drx-onDurationTimer, drx-InactivityTimer, drx-RetransmissionTimerDL, drx-RetransmissionTimerUL, or ra-ContentionResolutionTimer is running. Active Time also includes when a Scheduling Request is sent on Physical Uplink Control Channel (PUCCH) and is pending, and when a PDCCH indicates a new transmission addressed to the C-RNTI of the MAC entity has not been received after successful reception of a Random Access Response for the Random Access Preamble not selected by the MAC entity among the contention-based Random Access Preamble.

FIGS. 2-9 illustrate embodiments implementing PDCCH monitoring skipping.

Figure 2:
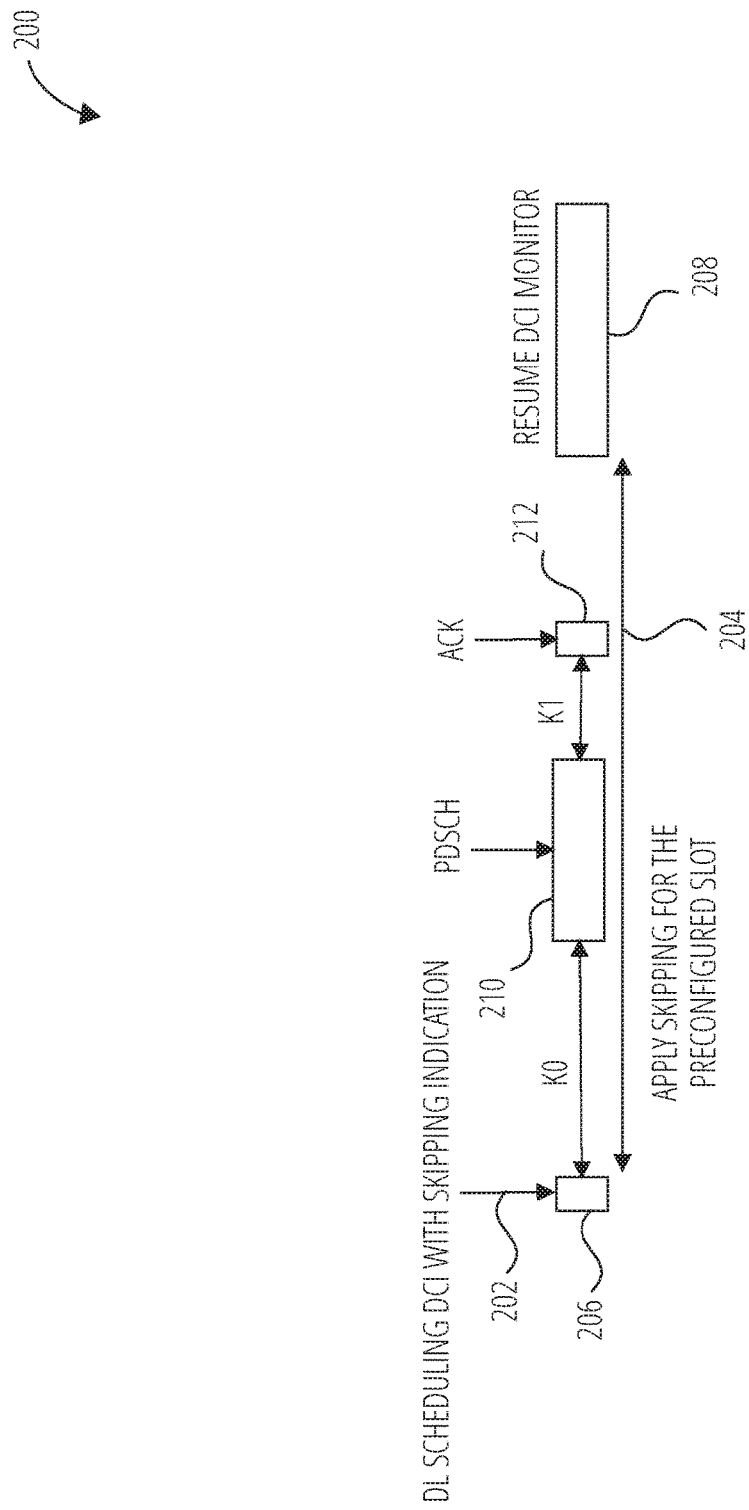
FIG. 2 illustrates a downlink timeline of a UE applying PDCCH monitoring skipping after receiving a scheduling DCI with skipping indication according to a first embodiment.

FIG. 2 illustrates a downlink timeline 200 of a UE applying PDCCH monitoring skipping after receiving a scheduling DCI with skipping indication according to a first embodiment. In this embodiment, the UE applies skipping 204 for a preconfigured slot as soon as the UE knows there is a skipping indication in the scheduling DCI 202.

As shown, the network node transmits the scheduling DCI 202 during a first time period 206. The UE receives and processes the scheduling DCI 202. In the illustrated embodiment, if the UE determines that the scheduling DCI 202 includes a skipping indication, the UE applies skipping 204 immediately. In other words, in the illustrated embodiment, the UE does not perform PDCCH monitoring for a period of time after the scheduling DCI is received and processed. The processing time will depend on the processing capability of the UE and can be quite small. Thus, skipping 204 may be applied immediately after the scheduling DCI 202 with skipping indication is received and processed.

The amount of time that the UE spends skipping 204 monitoring the PDCCH may be a preconfigured number of slots or an amount of time. During this time the UE is not monitoring PDCCH and therefore conserving power. The UE may resume monitoring 208 after the preconfigured skipping slot or period of time.

However, in some embodiments a cross-slot option may be enabled. When the cross-slot option is enabled, the scheduling DCI 202 may indicate that there is a PDSCH. Accordingly, the UE may skip PDCCH monitoring but still receive the PDSCH 210 and transmit an acknowledgment (ACK) message 212 during the skipping 204 period.

Figure 3A:
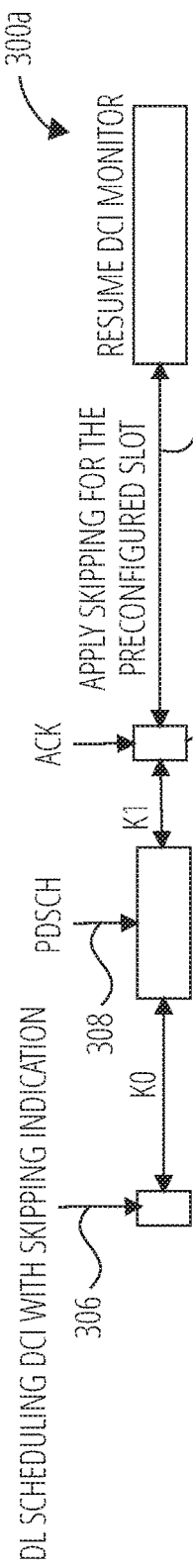
FIG. 3A illustrates a downlink timeline of a UE applying PDCCH monitoring skipping after transmitting an ACK message.
Figure 3B:
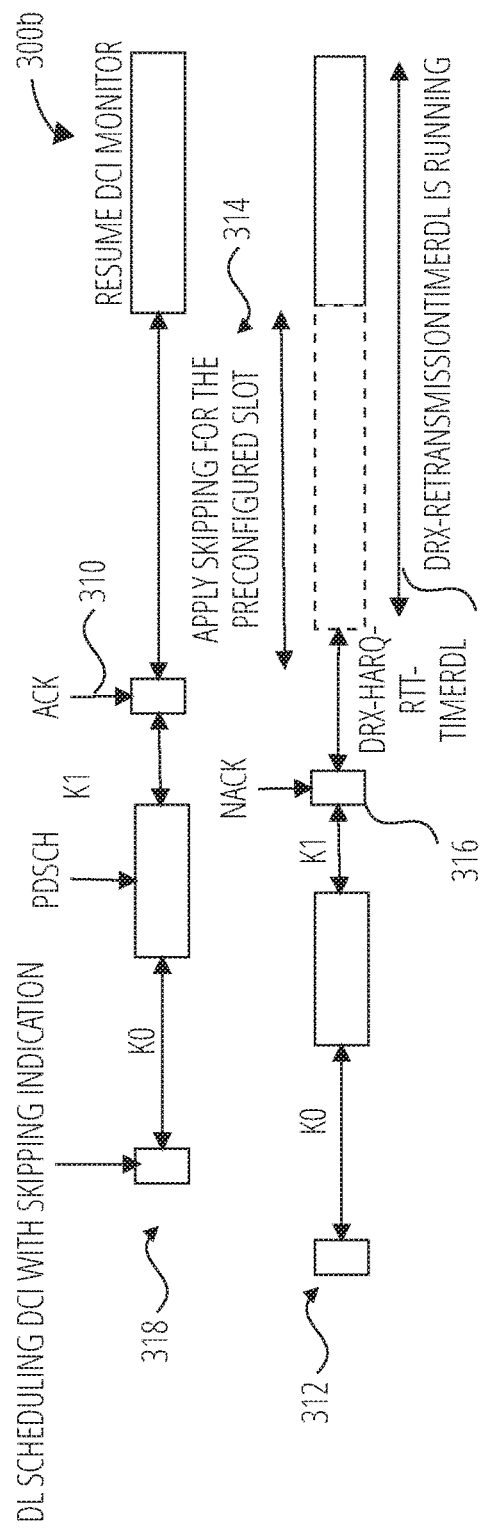
FIG. 3B illustrates a downlink timeline of a UE applying PDCCH monitoring skipping after transmitting an ACK message even with an ongoing previous HARQ request.
Figure 3C:
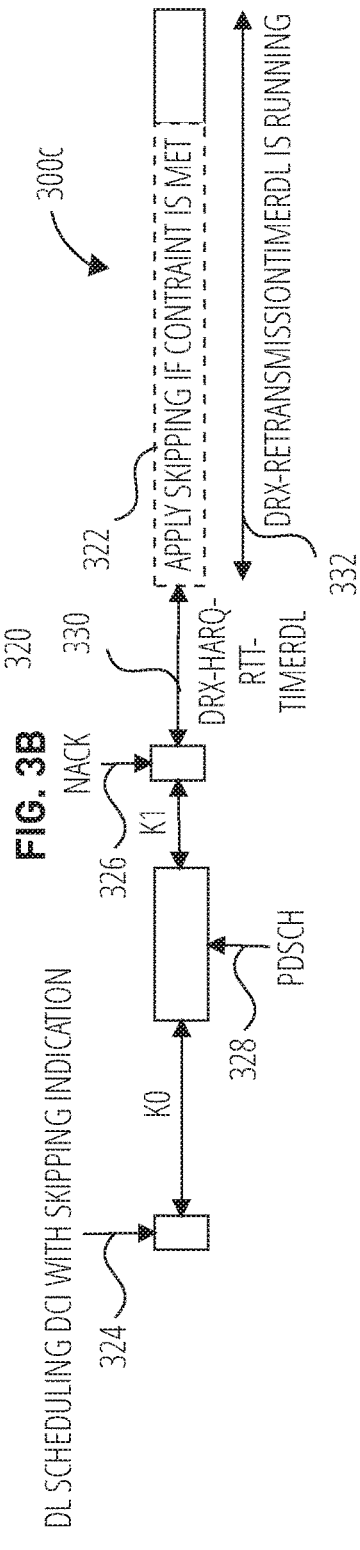
FIG. 3C illustrates a downlink timeline of a UE applying PDCCH monitoring skipping after transmitting a NACK message according to some embodiments.

FIGS. 3A-3C illustrate downlink timelines of a UE applying PDCCH monitoring skipping based on ACK messages and negative-acknowledgment (NACK) messages according to some embodiments.

FIG. 3A illustrates a downlink timeline 300a of a UE applying PDCCH monitoring skipping after transmitting an ACK message 302. In this embodiment, the UE applies skipping 204 for a preconfigured slot after the UE transmits an ACK message 302 if the received downlink scheduling DCI 306 includes a skipping indication.

As shown, the network node transmits the scheduling DCI 306 during a first time period. The UE receives and processes the scheduling DCI 306. In the illustrated embodiment, if the UE determines that the scheduling DCI 306 includes a skipping indication, the UE proceeds with receiving the PDSCH 308 from the network node and transmitting the ACK message 302 to the network node. After the ACK message 302 is transmitted, the UE may apply skipping 304. In other words, in the illustrated embodiment, the UE does not perform PDCCH monitoring for a period of time after the ACK message 302 is transmitted.

The amount of time that the UE spends skipping monitoring the PDCCH may be a preconfigured number of slots or an amount of time. During this time the UE is not monitoring PDCCH and therefore conserving power. The UE may resume monitoring 208 after the preconfigured skipping slot or period of time.

FIG. 3B illustrates a downlink timeline 300b of a UE applying PDCCH monitoring skipping 314 after transmitting an ACK message 310 even with an ongoing previous HARQ request 312. As explained with reference to FIG. 3A, in some embodiments the UE applies PDCCH monitoring skipping 314 after the ACK message. In the illustrated embodiment, this timing applies even when there is an ongoing previous HARQ request 312.

As shown, the UE has transmitted a NACK message 316 for the previous HARQ request 312 before the ACK message 310 of the current HARQ request 318. Even though a retransmission timer 320 of the previous HARQ request 312 is running, the UE may still apply the PDCCH monitoring skipping 314. Thus, the PDCCH monitoring skipping 314 may be applied to skip PDCCH monitoring during part of the time period associated with the retransmission timer 320 of the previous HARQ request 312.

FIG. 3C illustrates a downlink timeline 300c of a UE applying PDCCH monitoring skipping 322 after transmitting a NACK message 326 according to some embodiments. The timeline discussed with reference FIG. 3C may be used in combination with FIG. 3A and FIG. 3B. For example, if an ACK message is transmitted a UE may follow the timelines outlined in FIG. 3A and FIG. 3B, but if the UE transmits the NACK message 326 the UE may follow the timeline in FIG. 3C.

In the illustrated embodiment, the network node transmits the scheduling DCI 324 during a first time period. The UE receives and processes the scheduling DCI 324. In the illustrated embodiment, if the UE determines that the scheduling DCI 324 includes a skipping indication, the UE proceeds with receiving the PDSCH 328 from the network node. If the PDSCH 328 is not successfully decoded, the UE may transmit the NACK message 326 to the network node.

After the NACK message 326 is transmitted, the UE may apply PDCCH monitoring skipping 322.

More specifically, in some embodiments, the UE may apply the PDCCH monitoring skipping 322 immediately after the NACK message 326 is transmitted. In other embodiments, the UE may apply PDCCH monitoring skipping 322 after the drx-HARQRTTTimerDL 330. Accordingly, the UE may actually perform PDCCH monitoring skipping 322 while a retransmission timer 332 is running. This may provide a scheduling constraint at the network node. That is, the network node may determine not to perform retransmission until after the skipping period even though the retransmission timer 332 is running.

Figure 4:
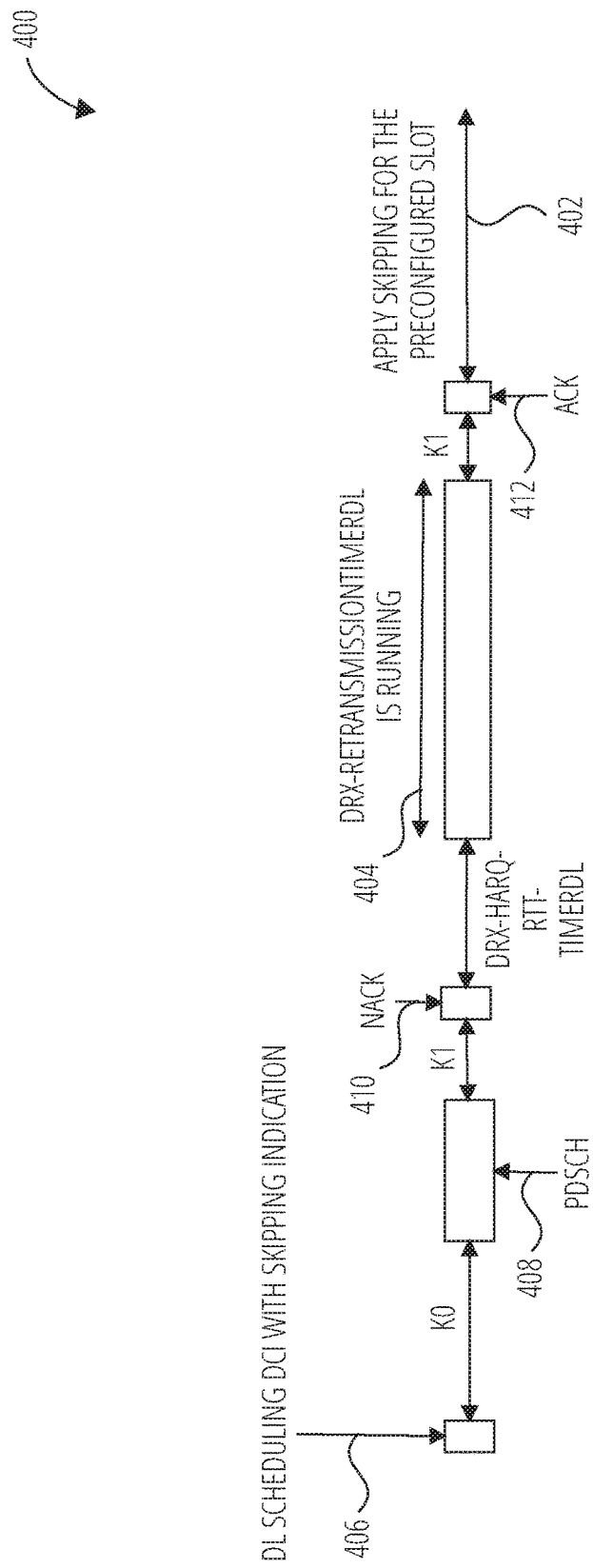
FIG. 4 illustrates a downlink timeline of a UE applying PDCCH monitoring skipping after a DRX-retransmission-TimerDL is expired in accordance with one embodiment.

FIG. 4 illustrates a downlink timeline 400 of a UE applying PDCCH monitoring skipping 402 after a DRX-retransmissionTimerDL 404 is expired. In this embodiment, the UE applies PDCCH monitoring skipping 402 for a preconfigured slot after a successful retransmission.

As shown, the network node transmits the scheduling DCI 406. The UE receives and processes the scheduling DCI 406. In the illustrated embodiment, if the UE determines that the scheduling DCI 306 includes a skipping indication, the UE proceeds with receiving the PDSCH 408 from the network node and transmitting a NACK message 410 to the network node when the PDSCH 408 is not successfully decoded. Unlike FIG. 3C, the UE does not apply PDCCH monitoring skipping 402 after the NACK message 410. Instead, the UE attempts to receive a retransmission while the DRX-retransmissionTimerDL 404. If a retransmitted PDSCH is successfully received by the UE, the UE transmits the ACK message 412.

After the ACK message 412 is transmitted and the DRX-retransmissionTimerDL 404 is expired, the UE may apply PDCCH monitoring skipping 402. In this embodiment, cross-slot may be enabled, and no DCI transmission occurs in K0 and K1.

In this embodiment, the UE may apply PDCCH monitoring skipping 402 right after DRX-retransmissionTimerDL 404 is expired. The DRX-retransmissionTimerDL 404 is per HARQ processes. That is multiple downlink DRX-retransmission Timers may be present if there are multiple HARQ processes. In some embodiments, the UE may apply PDCCH monitoring skipping 402 when all HARQ process retransmissions are finished. In other words, the UE may wait until all downlink DRX-retransmission Timers have expired. Further, in some embodiments, when PDCCH monitoring skipping 402 is applied, drx-OndurationTimer and drx-inactivityTimer continue to count down.

Figure 5:
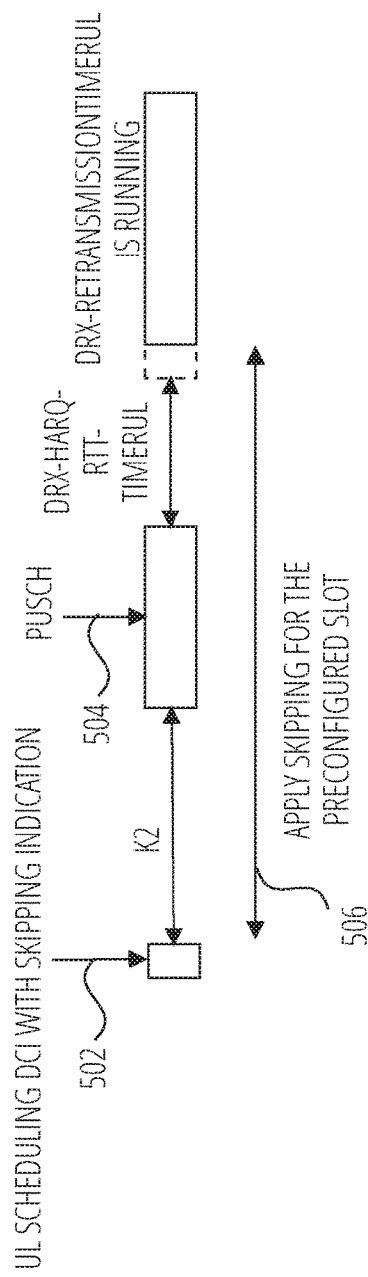
FIG. 5 illustrates an uplink timeline of a UE applying PDCCH monitoring skipping 506 after receiving a scheduling DCI with skipping indication in accordance with one embodiment.

FIG. 5 illustrates an uplink timeline 500 of a UE applying PDCCH monitoring skipping 506 after receiving a scheduling DCI 502 with skipping indication. In this embodiment, the UE applies PDCCH monitoring skipping 506 for a preconfigured slot as soon as the UE knows there is a skipping indication in the scheduling DCI 502.

As shown, the network node transmits the scheduling DCI 502. The UE receives and processes the scheduling DCI 502. In the illustrated embodiment, if the UE determines that the scheduling DCI 502 includes a skipping indication, the UE applies PDCCH monitoring skipping 506 immediately. In other words, in the illustrated embodiment, the UE does not perform PDCCH monitoring for a period of time after the scheduling DCI is received and processed. The processing time will depend on the processing capability of the UE and can be quite small. Thus, PDCCH monitoring skipping 506 may be applied immediately after the scheduling DCI 502 with skipping indication is received and processed.

Figure 6A:
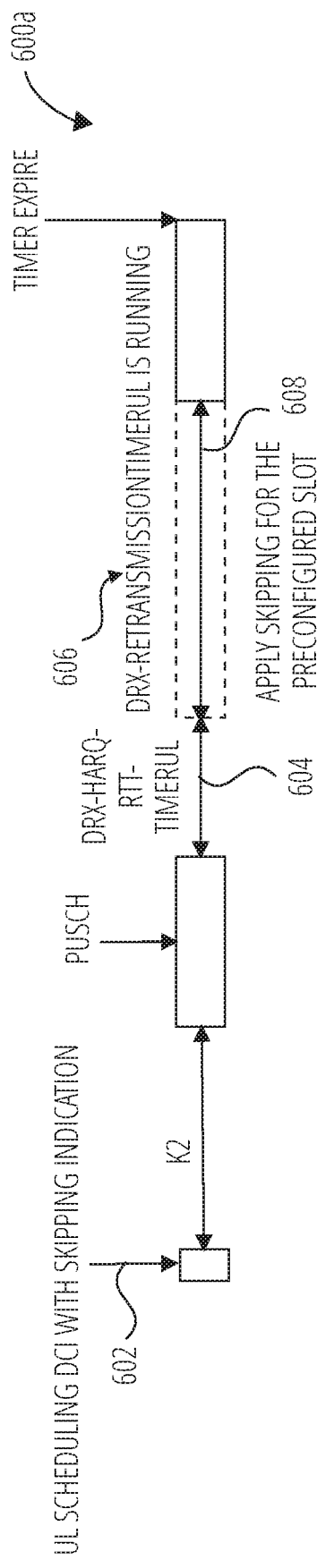
FIG. 6A illustrates applying the PDCCH monitoring skipping after a drx-HARQRTTTimerUL when the uplink timeline includes an ACK message according to some embodiments.
Figure 6B:
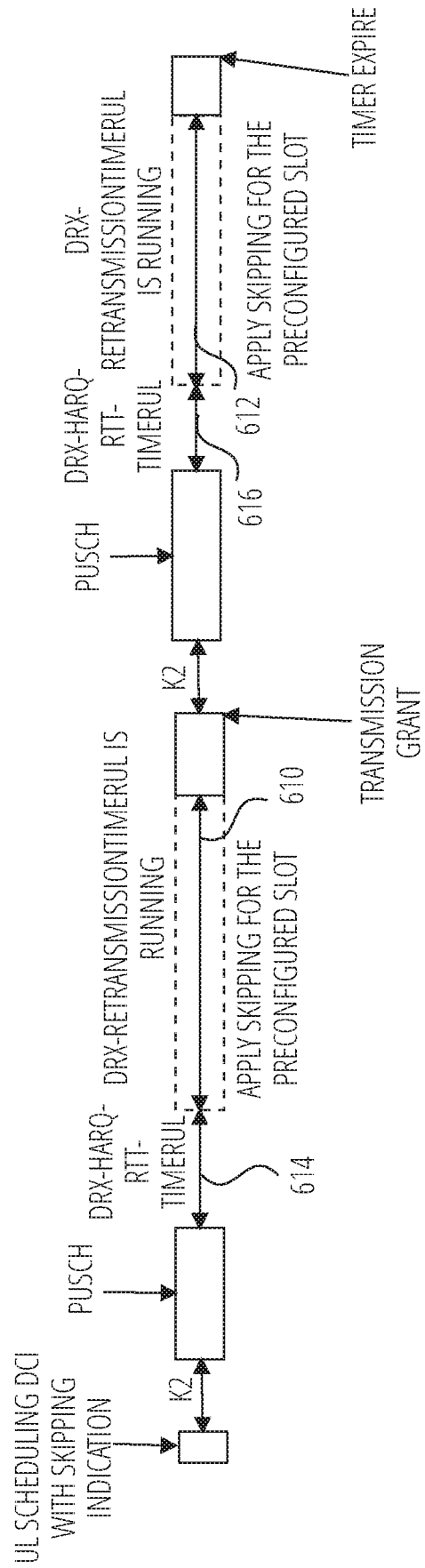
FIG. 6B illustrates applying PDCCH monitoring skipping after a drx-HARQRTTTimerUL when the uplink timeline includes a NACK message according to some embodiments.

FIGS. 6A and 6B illustrate two example uplink timelines of applying PDCCH monitoring skipping after drx-HARQRTTTimerUL is expired according to some embodiments.

More specifically, FIG. 6A illustrates applying the PDCCH monitoring skipping 608 after a drx-HARQRTTTimerUL 604 when the uplink timeline includes an ACK message according to some embodiments. As shown, the network node transmits the scheduling DCI 406. The UE receives and processes the scheduling DCI 602, and then applies the PDCCH monitoring skipping 608 after a drx-HARQRTTTimerUL 604. As the PDCCH monitoring skipping 608 is applied while the retransmission timer 606 is running, the network may take the timing of the skipping into consideration as a scheduling constraint when attempting to communicate with the UE.

Alternatively, in some embodiments, the UE may apply the PDCCH monitoring skipping 608 immediately after a PUSCH transmission finishes. In these embodiments, the PDCCH monitoring skipping 608 would start at the same time as the drx-HARQRTTTimerUL starts.

FIG. 6B illustrates applying PDCCH monitoring skipping (e.g., first skipping 610 and second skipping 612) after a drx-HARQRTTTimerUL (e.g., first timer 614 and second timer 616) when the uplink timeline includes a NACK message according to some embodiments. As shown, a HARQ process with a NACK may include two drx-HARQRTTTimerUL after a first transmission and after a retransmission. However, in this embodiment, the logic remains the same. That is after each drx-HARQRTTTimerUL the UE applies PDCCH monitoring skipping. Once again, the PDCCH monitoring behavior may be considered as a scheduling constraint by the network node.

FIGS. 7A and 7B illustrate two example uplink timelines of applying PDCCH monitoring skipping after retransmission timers expire. After the retransmission timer expires, there may be no traffic that the UE may miss during the PDCCH monitoring skipping.

More specifically, FIG. 7A illustrates applying the PDCCH monitoring skipping 704 after a drx-retransmissionTimerUL 702 expires when the uplink timeline includes an ACK message according to some embodiments. As shown, the network node transmits the scheduling DCI with skipping indication. The UE receives and processes the scheduling DCI. The UE keeps monitoring while the drx-retransmissionTimerUL 702 is running and applies the PDCCH monitoring skipping 704 when the timer expires. This may cause the UE to only apply PDCCH monitoring skipping 704 when all HARQ processes retransmission are finished.

For example, FIG. 7B illustrates applying PDCCH monitoring skipping 712 after a drx-retransmissionTimerUL timer expires when the uplink timeline includes a NACK message according to some embodiments. As shown, the network node transmits the scheduling DCI 708 with skipping indication. The UE receives and processes the scheduling DCI 708. A first drx-retransmissionTimerUL 706 ends in a transmission grant due to the NACK message and therefore does not expire. Accordingly, the UE waits until a second drx-retransmissionTimerUL 710 expires to apply the PDCCH monitoring skipping 712.

Additionally, in the embodiments outlined with respect to FIGS. 5-7B, when PDCCH monitor skipping is applied, drx-OndurationTimer and drx-inactivityTimer may continue to count down.

Figure 8:
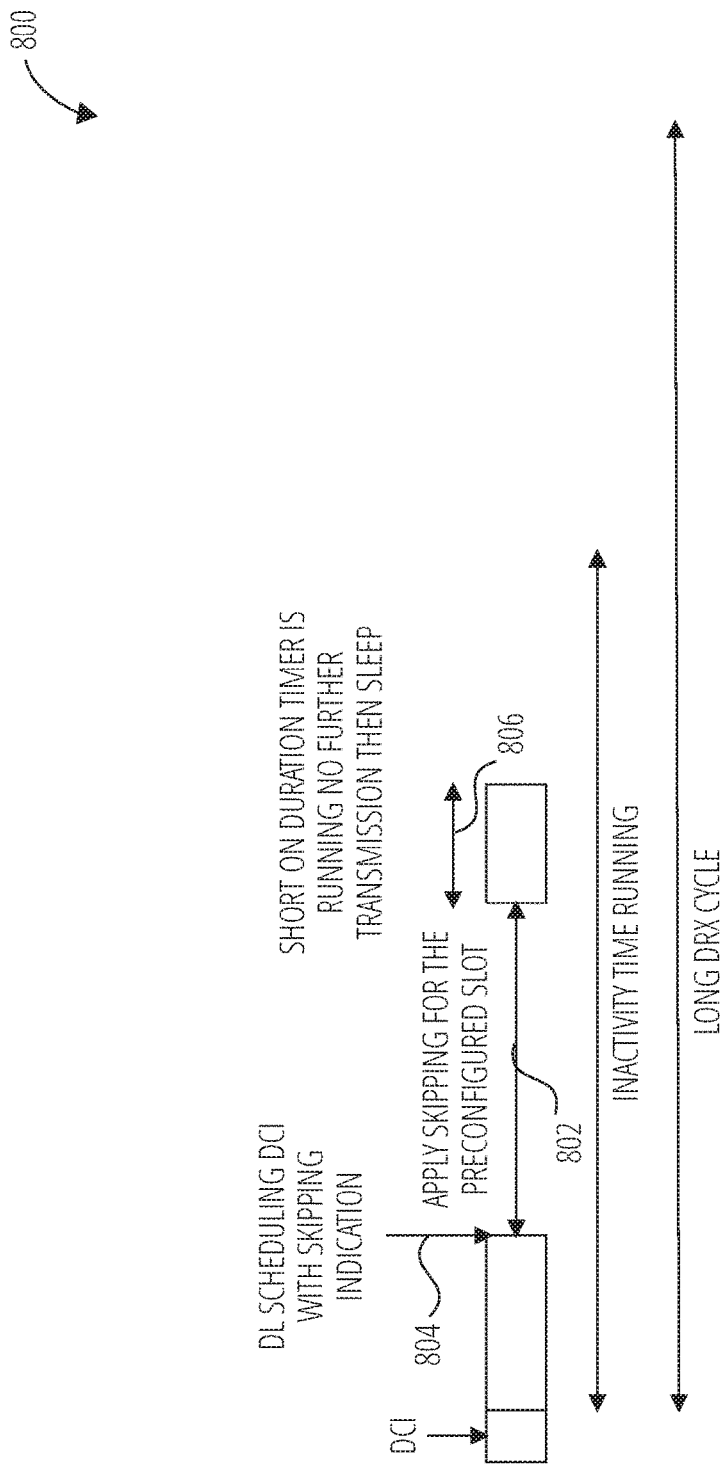
FIG. 8 illustrates a timeline for applying skipping when there is no traffic to schedule resulting in no scheduling DCIs being transmitted in accordance with one embodiment.

FIG. 8 illustrates a timeline 800 for applying skipping when there is no traffic to schedule resulting in no scheduling DCIs being transmitted. In the illustrated embodiment, the UE uses a timer to determine when to apply PDCCH monitoring skipping 704.

As shown, the UE receives a scheduling DCI 804 with skipping indication. The scheduling DCI 804 causes the UE to apply PDCCH monitoring skipping 802 for a period of time. After a certain number of slots, the UE wakes up to continue to monitor. In the illustrated embodiment, during this wake window a duration timer 806 runs. If the duration timer 806 expires without new downlink or uplink traffic, the UE may return to PDCCH monitoring skipping.

In some embodiments, the timer may be a preconfigured value. If UE does not receive a scheduling DCI during that preconfigured time, the UE may skip another pre-configured number of slots. The timer provides low overhead to implement no traffic skipping.

Figure 9:
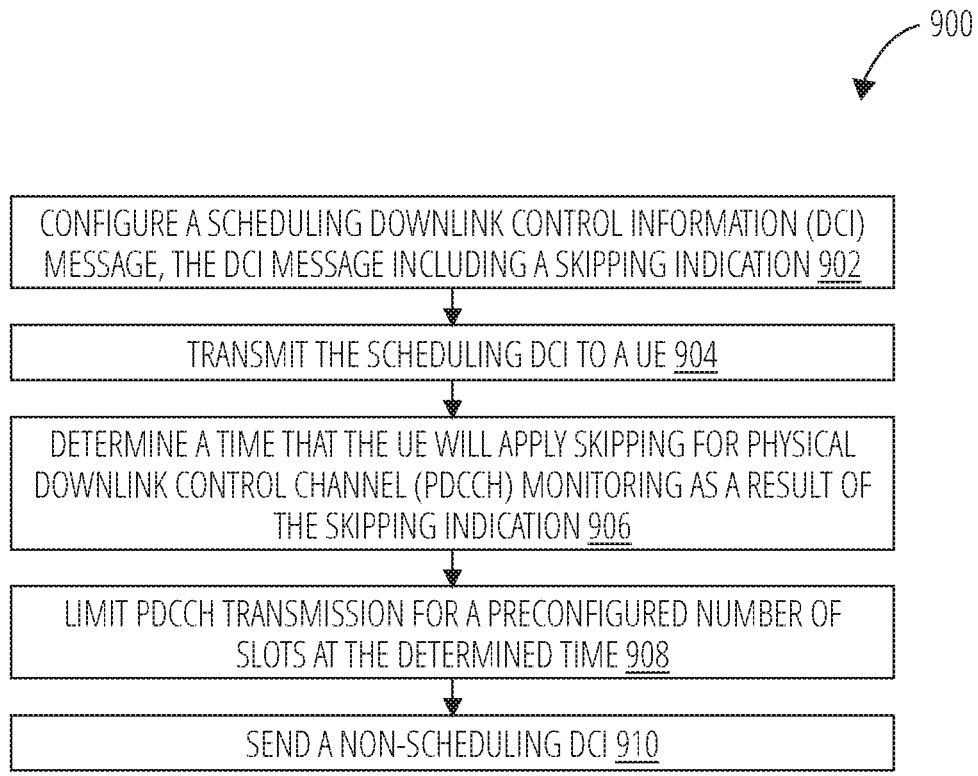
FIG. 9 illustrates a method for a network node to send a non-scheduling DCI in accordance with one embodiment.

In some embodiments, rather than a timer, the network node may transmit a non-schedule DCI to manipulate PDCCH monitoring behavior (e.g., skipping). For example, FIG. 9 illustrates a method 900 for a network node to send a non-scheduling DCI. In block 902, method 900 configures a scheduling downlink control information (DCI) message, the DCI message including a skipping indication. In block 904, method 900 transmits the scheduling DCI to a UE. In block 906, method 900 determines a time that the UE will apply skipping for physical downlink control channel (PDCCH) monitoring as a result of the skipping indication. In block 908, method 900 limits PDCCH transmission for a preconfigured number of slots at the determined time. In block 910, method 900 sends a non-scheduling DCI.

The non-scheduling DCI may comprise a skip indication field indicating whether the UE should apply PDCCH monitoring skipping for another pre-configured number of slots. The non-scheduling DCI may be group based or UE specific.

In some embodiments of a group based non-scheduling DCI, the following information may be transmitted by means of the DCI format 2_6 with CRC scrambled by PS-RNTI, a new DCI format with CRC scrambled by a new RNTI:

block number 1, block number 2, . . . , block number N
   where the starting position of a block is determined by the parameter ps-PositionDCI-2-6 provided by higher layers for the UE configured with the block.

If the UE is configured with higher layer parameter PS-RNTI and dci-Format2-6, one block is configured for the UE by higher layers, with the following fields defined for the block:

Skip indication field—1 bit if the skip indication field is set to 1, the UE may apply PDCCH monitoring skipping for another pre-configured skip value.

SCell dormancy indication—put Scell to skip in cross-carrier scheduling.

The size of DCI format 2_6 may be indicated by the higher layer parameter sizeDCI-2-6.

In some embodiments, the PDCCH monitoring behavior of each UE may be used to reduce a future DCI sizes based on content of wake up signals (WUS) (e.g., DCI format 2_6). For example, if some UEs are configured to skip an entire DRX cycle, those fields are not used in the skipping indication of the non-scheduling DCI. A similar rule may apply to the Scell dormancy indication. Thus, the DCI may have a dynamic size. The dynamic size may result in slightly better decoding performance as the DCI is able to be reduced in size when some UEs are skipping PDCCH monitoring.

The UEs receiving the group based non-scheduling DCI may decode the DCI and determine one or more bits that correspond to the UE. The UE may determine if the corresponding bits indicate whether the UE should apply PDCCH monitoring skipping.

In some embodiments using UE specific non-scheduling DCI, the DCI format bay be 0-1 or 1-1. The network node may transmit a non-scheduling DCI to each of the UEs to direct the UE to perform skipping or to monitor PDCCH.

Figure 10:
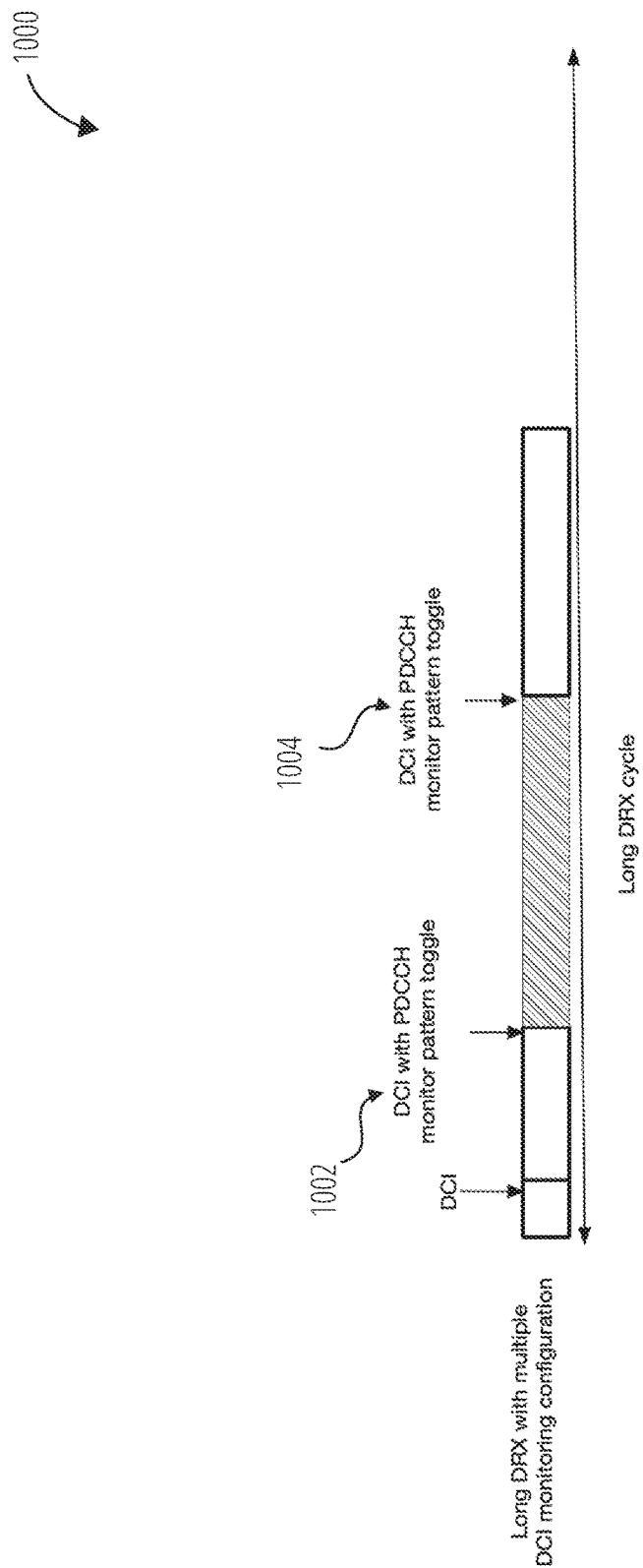
FIG. 10 illustrates a timeline where a UE PDCCH monitoring behavior changes based on a DCI with PDCCH monitor pattern indication in accordance with one embodiment.

FIG. 10 illustrates a timeline 1000 where a UE PDCCH monitoring behavior changes based on a DCI with PDCCH monitor pattern indication (e.g., first DCI 1002 and second DCI 1004). In the illustrated embodiment, the UE may support search space/coreset change together with band width part (BWP) switching. The power saving search space/coreset configuration may be a subset of the default pattern. In case switching DCI is missed, UE may perform DCI monitoring with a default pattern. For the BWP the UE may change configuration to do PDDCH monitoring in more or less slots. For example, the UE may monitor every slot before receiving the first DCI 1002. BWP switching may be Y (ms) after last packet/data burst. For instance, Y=[8], other values are not precluded.

In the first DCI 1002, the network node may indicate to the UE to switch the monitoring behavior to be less frequent. If the network node does not expect as much traffic, the network node may instruct the UE to reduce the number of slots monitored. For instance, the UE may move from monitoring every slot to monitoring every five slots. A second DCI 1004 may toggle the monitoring behavior back to monitoring more frequently (e.g., every slot).

Figure 11:
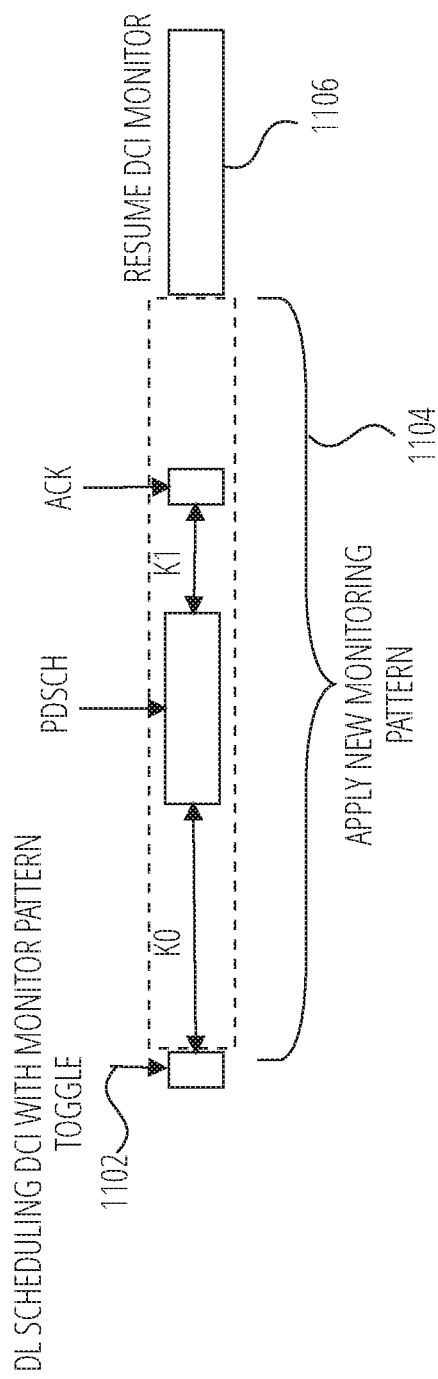
FIG. 11 illustrates a first timing option of when to apply the search space/coreset change during a downlink timeline in accordance with one embodiment.
Figure 12A:
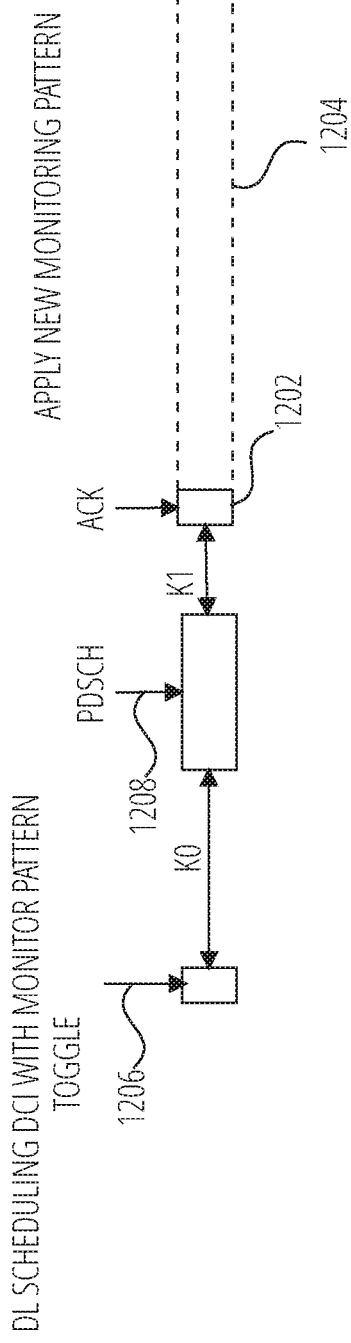
FIG. 12A illustrates the second timing option of when to apply the search space/coreset change during a downlink timeline in accordance with one embodiment.
Figure 12B:
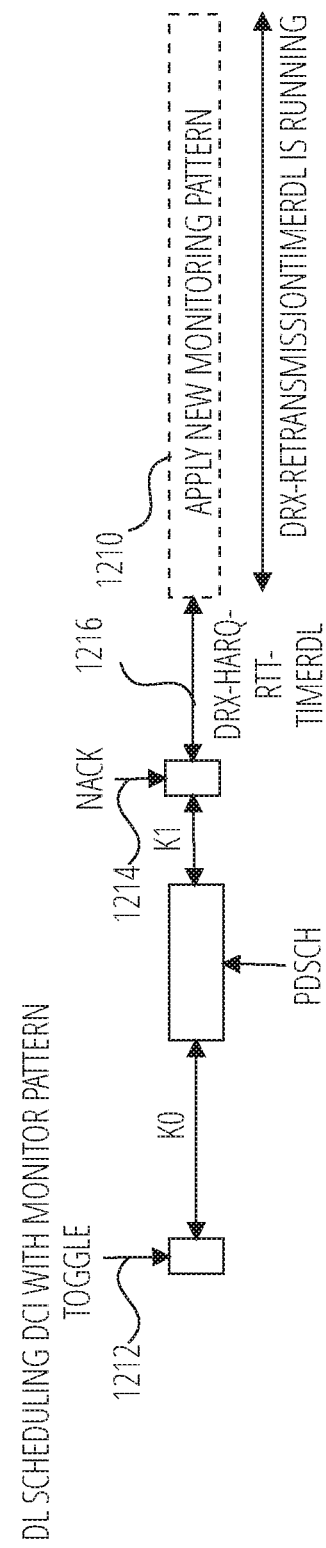
FIG. 12B illustrates the second timing option of when to apply the search space/coreset change during a downlink timeline if a NACK message is transmitted in accordance with one embodiment.
Figure 13:
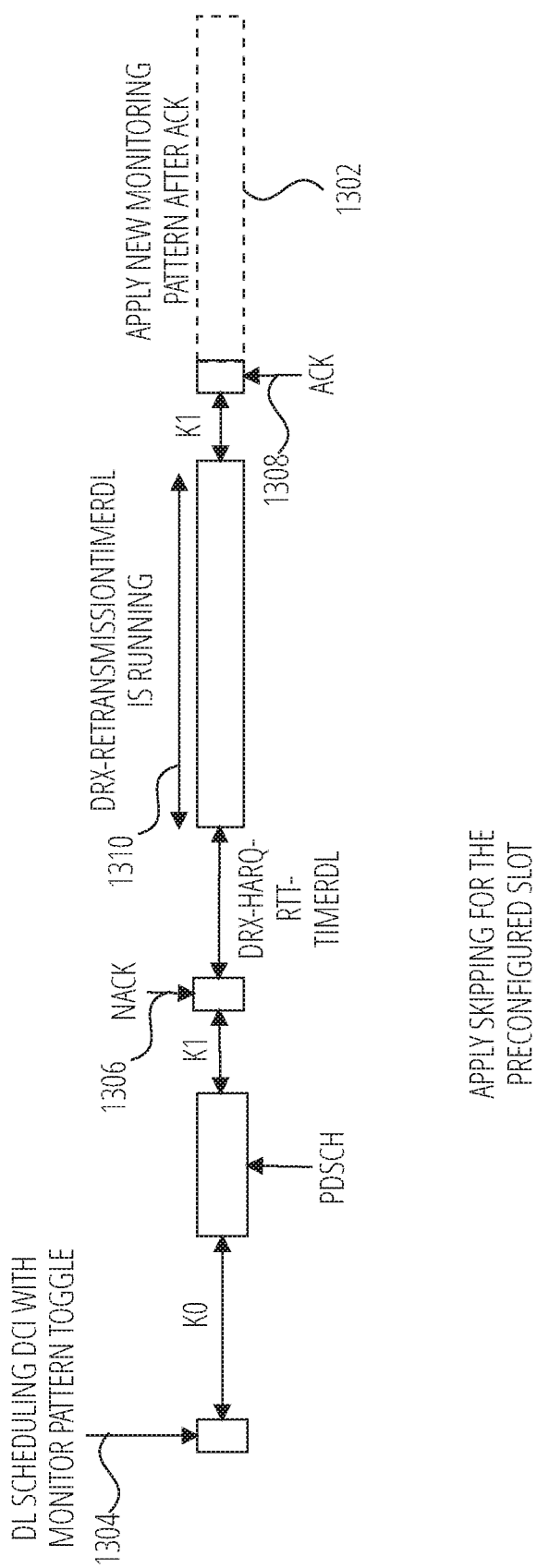
FIG. 13 illustrates a third timing option of when to apply the search space/coreset change during a downlink timeline in accordance with one embodiment.

FIGS. 11-13 illustrate downlink timelines for three embodiments for applying the search space/coreset change. FIG. 11 illustrates a first timing option of when to apply the search space/coreset change during a downlink timeline. FIGS. 12A and 12B illustrate a second timing option of when to apply the search space/coreset change during a downlink timeline. FIG. 13 illustrates a third timing option of when to apply the search space/coreset change during a downlink timeline.

In the embodiment illustrated in FIG. 11, the UE receives and processes the scheduling DCI 1102 with a monitor pattern indication. The monitor pattern toggle may be an indication to use a first pattern or a second pattern. In this embodiment, the UE then applies a new monitoring pattern 1104 based on the monitor pattern indication immediately after the scheduling DCI 1102 is processed. The monitor pattern indication may cause the UE to adjust PDCCH monitoring behavior (e.g., apply a search space/coreset change). The new monitoring pattern 1104 may be preconfigured. The UE may resume the original DCI monitoring pattern 1106 after a preconfigured amount of time.

In the embodiment illustrated in FIG. 12A, the UE receives and processes the scheduling DCI 1206 with a monitor pattern indication. In this embodiment, the UE may apply the new monitoring pattern 1204 after the ACK message 1202. The monitor pattern indication may cause the UE to adjust PDCCH monitoring behavior (e.g., apply a search space/coreset change). The new monitoring pattern 1204 may be preconfigured. The UE may resume the original DCI monitoring pattern 1106 after a preconfigured amount of time.

FIG. 12B illustrates what the embodiment of the UE described in FIG. 12A does in a case where a NACK message is transmitted. As shown, the UE receives and processes the scheduling DCI 1206 with a monitor pattern indication. In this embodiment, the UE transmits a NACK 1214 after failing to decode a received PDSCH. The UE may then apply the new monitoring pattern 1210 after the drx-HARQRTTtimerDL 1216 expires. The monitor pattern indication may cause the UE to adjust PDCCH monitoring behavior (e.g., apply a search space/coreset change). The new monitoring pattern 1210 may be preconfigured. The UE may resume the original DCI monitoring pattern 1106 after a preconfigured amount of time.

In the embodiment illustrated in FIG. 13, the UE receives and processes the scheduling DCI 1304 with a monitor pattern indication. In this embodiment, the UE may apply the new monitoring pattern 1302 after the ACK message 1308. However, unlike the embodiment in FIGS. 12A and 12B, in this embodiment the UE keeps monitoring after a NACK 1306 while the drx-retransmissionTimerDL 1310 is running.

The monitor pattern indication may cause the UE to adjust PDCCH monitoring behavior (e.g., apply a search space/coreset change). The new monitoring pattern 1302 may be preconfigured. The UE may resume the original DCI monitoring pattern 1106 after a preconfigured amount of time.

Figure 14:
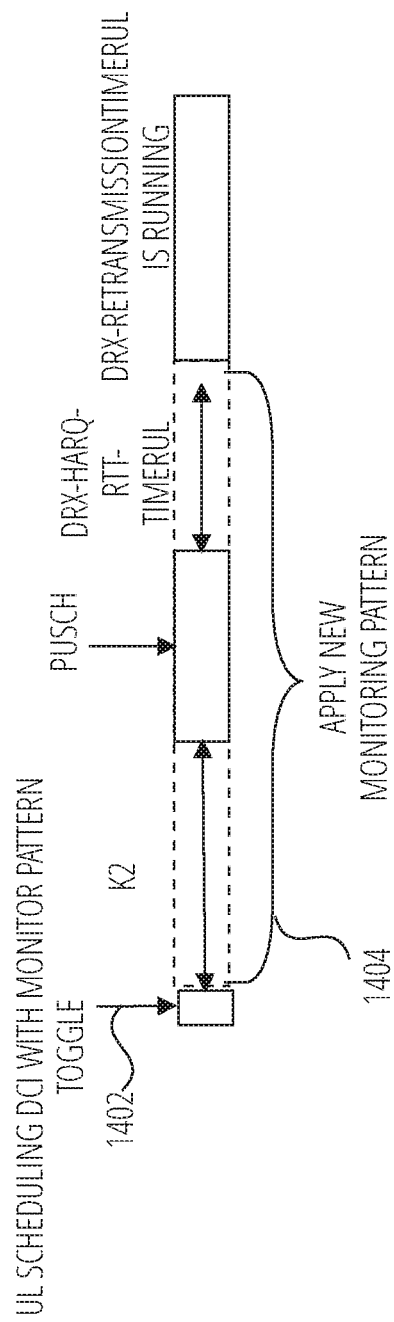
FIG. 14 illustrates a first timing option of when to apply the search space/coreset change during an uplink timeline in accordance with one embodiment.
Figure 15A:
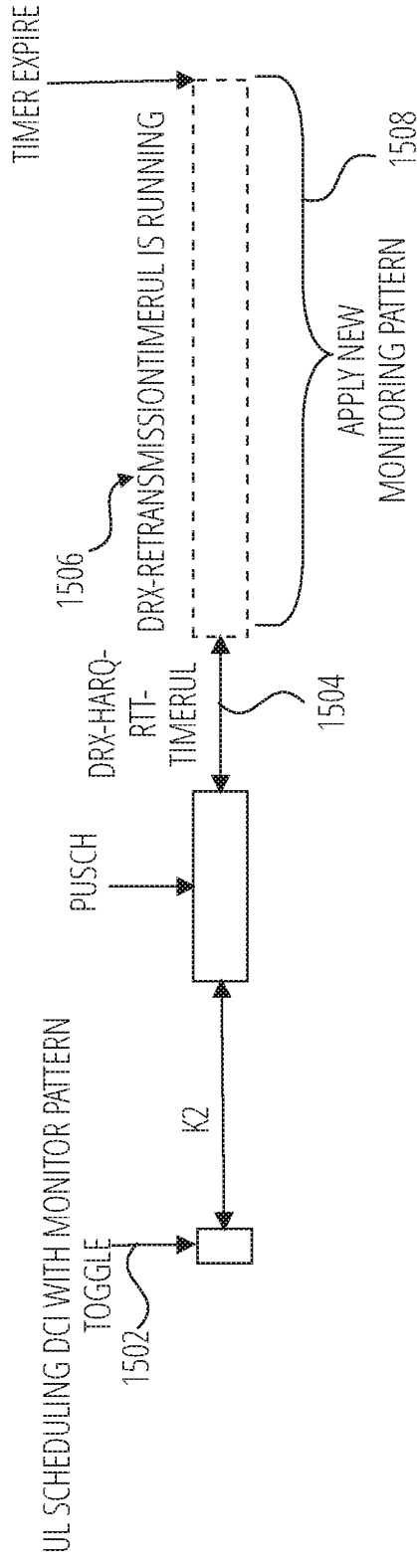
FIG. 15A illustrates a second timing option of when to apply the search space/coreset change during an uplink timeline in accordance with one embodiment.
Figure 15B:
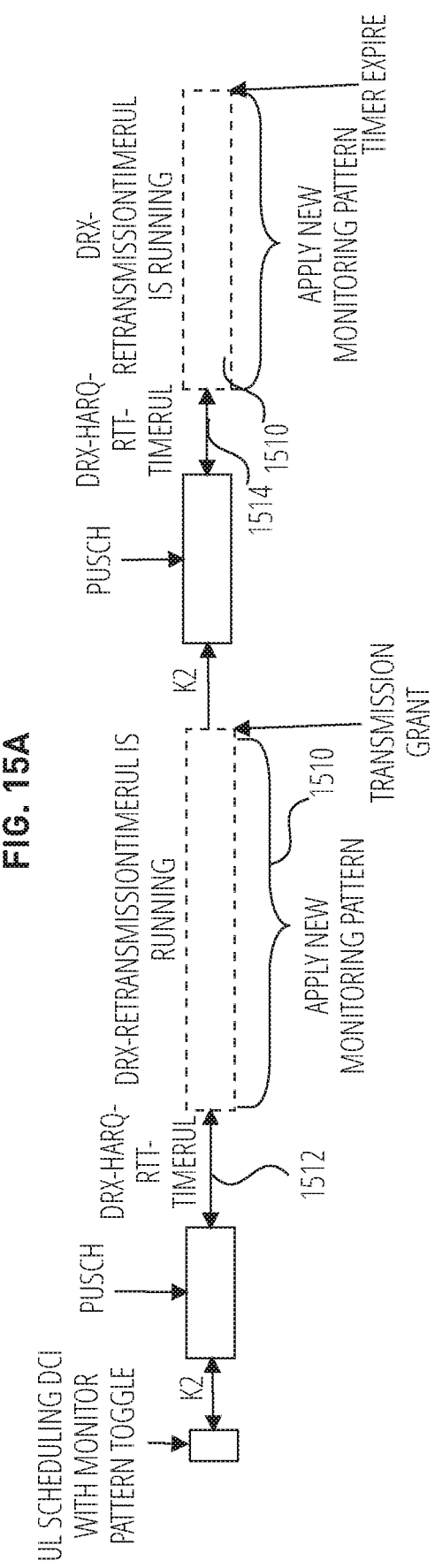
FIG. 15B illustrate the second timing option of when to apply the search space/coreset change during an uplink timeline when a NACK message is transmitted in accordance with one embodiment.

FIGS. 14-16 illustrate uplink timelines for three embodiments for applying the search space/coreset change. FIG. 14 illustrates a first timing option of when to apply the search space/coreset change during an uplink timeline. FIGS. 15A and 15B illustrate a second timing option of when to apply the search space/coreset change during an uplink timeline. FIGS. 16A and 16B illustrate a third timing option of when to apply the search space/coreset change during an uplink timeline.

In the embodiment illustrated in FIG. 14, the UE receives and processes the scheduling DCI 1402 with a monitor pattern indication. In this embodiment, the UE then applies a new monitoring pattern 1404 based on the monitor pattern indication immediately after the scheduling DCI 1402 is received and processed. The monitor pattern indication may cause the UE to adjust PDCCH monitoring behavior (e.g., apply a search space/coreset change). The new monitoring pattern 1404 may be preconfigured. The UE may resume the original DCI monitoring pattern after a preconfigured amount of time.

In the embodiment illustrated in FIG. 15A, the UE receives and processes the scheduling DCI 1502 with a monitor pattern indication. In this embodiment, the UE may apply the new monitoring pattern 1508 after the drx-HARQRTTTimerUL 1504 is expired. The monitor pattern indication may cause the UE to adjust PDCCH monitoring behavior (e.g., apply a search space/coreset change). The new monitoring pattern 1508 may be preconfigured. The UE may resume the original DCI monitoring pattern after a preconfigured amount of time or after the drx-RetransmissionTimerUL 1506 expires.

FIG. 15B illustrates what the embodiment of the UE described in FIG. 15A does in a case where a NACK message is transmitted. As shown, the UE receives and processes the scheduling DCI 1206 with a monitor pattern indication. In this embodiment, the UE applies the new monitoring pattern 1510 after both of the drx-HARQRTT-TimerUL (e.g., first timer 1512 and second timer 1514) are expired.

In the embodiment illustrated in FIG. 16A, the UE receives and processes the scheduling DCI 1606 with a monitor pattern indication. In this embodiment, the UE may apply the new monitoring pattern 1604 after the drx-HARQretransmissionTimerUL 1602 is expired. The monitor pattern indication may cause the UE to adjust PDCCH monitoring behavior (e.g., apply a search space/coreset change). The new monitoring pattern 1604 may be preconfigured. The UE may resume the original DCI monitoring pattern after a preconfigured amount of time.

FIG. 16B illustrates what the embodiment of the UE described in FIG. 16A does in a case where a NACK message is transmitted. As shown, the UE receives and processes the scheduling DCI 1608 with a monitor pattern indication. In this embodiment, the UE applies the new monitoring pattern 1614 only after the second drx-HARQretransmissionTimerUL 1612 is expired. A first drx-HARQretransmissionTimerUL 1608 ends in a transmission grant due to the NACK message. Accordingly, the UE waits until a second drx-HARQretransmissionTimerUL 1612 expires to apply the PDCCH monitoring skipping 712.

In addition to the embodiments described with reference to FIGS. 11-16, each of these embodiments may include a default fallback monitoring pattern. For example, a UE may be configured with two search spaces/Coresets per BWP. One of the search spaces/Coresets may be a default (i.e., fallback) that is set with smaller monitoring periodicity and larger number of coreset, and the second search space/Coreset may comprise a larger monitoring periodicity. The second power saving search space/coreset configuration can be a subset of the default one, so in case UE miss the DCI indication to switch to power saving configuration, UE can still receive DCI correctly without the power saving benefit in this DRX cycle. At the beginning of each DRX cycle, UE may always fall back to use the default DRX cycle. In some embodiments, the switch between the search spaces/Coresets may be triggered using scheduling DCI and non-scheduling DCI.

In some embodiments, at the beginning of a DRX on duration, the UE monitors with the default search space/Coreset configuration. When the UE receives a gNB scheduling grant with 1 bit indication (e.g., DCI), indicating search space/Coreset switch, the UE may change to the other pre-configured search space/Coreset monitoring pattern. When no traffic is detected while an Inactivity Timer is running, the UE may keep monitor with large periodicity. In some embodiments, after a certain amount of time or number of slots, the UE may revert to the default search space/Coreset configuration.

Figure 17:
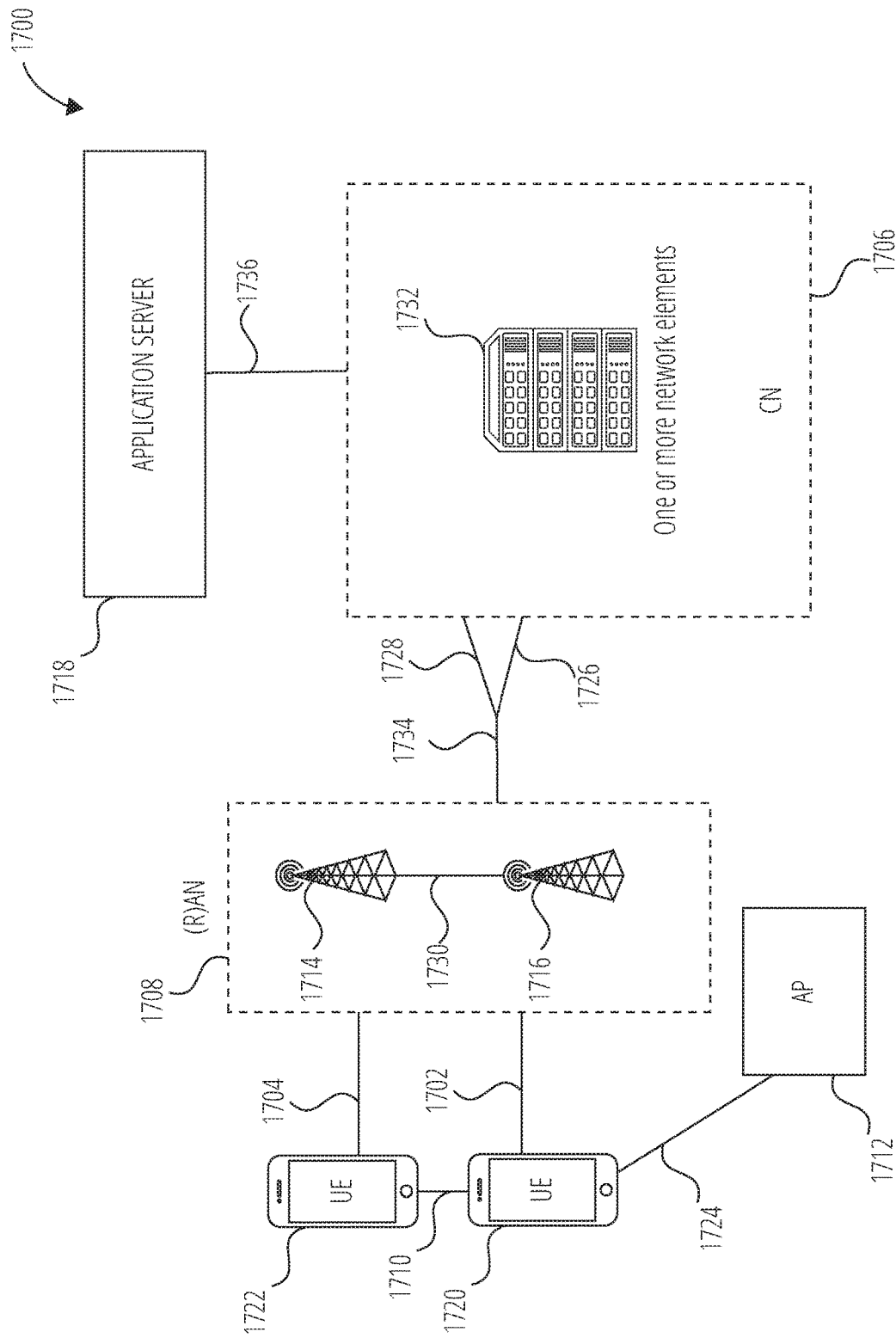
FIG. 17 illustrates a system in accordance with one embodiment.

FIG. 17 illustrates an example architecture of a system 1700 of a network, in accordance with various embodiments. The following description is provided for an example system 1700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 17, the system 1700 includes UE 1722 and UE 1720. In this example, the UE 1722 and the UE 1720 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1722 and/or the UE 1720 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1722 and UE 1720 may be configured to connect, for example, communicatively couple, with an access node or radio access node (shown as (R)AN 1708). In embodiments, the (R)AN 1708 may be an NG RAN or a 5G RAN, an E-UTRAN, or a legacy RAN, such as a UTRAN or GERAN. As used herein, the term "NG RAN" or the like may refer to a (R)AN 1708 that operates in an NR or 5G system, and the term "E-UTRAN" or the like may refer to a (R)AN 1708 that operates in an LTE or 4G system. The UE 1722 and UE 1720 utilize connections (or channels) (shown as connection 1704 and connection 1702, respectively), each of which comprises a physical communications interface or layer (discussed in further detail below).

In this example, the connection 1704 and connection 1702 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 1722 and UE 1720 may directly exchange communication data via a ProSe interface 1710. The ProSe interface 1710 may alternatively be referred to as a sidelink (SL) interface 110 and may comprise one or more logical channels, including but not limited to a PSCCH, a PSSCH, a PSDCH, and a PSBCH.

The UE 1720 is shown to be configured to access an AP 1712 (also referred to as "WLAN node," "WLAN," "WLAN Termination," "WT" or the like) via connection 1724. The connection 1724 can comprise a local wireless connection, such as a connection consistent with any IEEE 802.11 protocol, wherein the AP 1712 would comprise a wireless fidelity (Wi-Fi®) router. In this example, the AP 1712 may be connected to the Internet without connecting to the core network of the wireless system (described in further detail below). In various embodiments, the UE 1720, (R)AN 1708, and AP 1712 may be configured to utilize LWA operation and/or LWIP operation. The LWA operation may involve the UE 1720 in RRC_CONNECTED being configured by the RAN node 1714 or the RAN node 1716 to utilize radio resources of LTE and WLAN. LWTP operation may involve the UE 1720 using WLAN radio resources (e.g., connection 1724) via IPsec protocol tunneling to authenticate and encrypt packets (e.g., IP packets) sent over the connection 1724. IPsec tunneling may include encapsulating the entirety of original IP packets and adding a new packet header, thereby protecting the original header of the IP packets.

The (R)AN 1708 can include one or more AN nodes, such as RAN node 1714 and RAN node 1716, that enable the connection 1704 and connection 1702. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 1700 (e.g., an eNB). According to various embodiments, the RAN node 1714 or RAN node 1716 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1714 or RAN node 1716 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1714 or RAN node 1716); a MAC/PHY split wherein RRC, PDCP, RLC, and MAC layers are operated by the CRAN/vBBUP and the PHY layer is operated by individual RAN nodes (e.g., RAN node 1714 or RAN node 1716); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1714 or RAN node 1716 to perform other virtualized applications. In some implementations, an individual RAN node may represent individual gNB-DUs that are connected to a gNB-CU via individual F1 interfaces (not shown by FIG. 17). In these implementations, the gNB-DUs may include one or more remote radio heads or RFEMs, and the gNB-CU may be operated by a server that is located in the (R)AN 1708 (not shown) or by a server pool in a similar manner as the CRAN/vBBUP. Additionally, or alternatively, one or more of the RAN node 1714 or RAN node 1716 may be next generation eNBs (ng-eNBs), which are RAN nodes that provide E-UTRA user plane and control plane protocol terminations toward the UE 1722 and UE 1720, and are connected to an SGC via an NG interface (discussed infra). In V2X scenarios one or more of the RAN node 1714 or RAN node 1716 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 1714 and/or the RAN node 1716 can terminate the air interface protocol and can be the first point of contact for the UE 1722 and UE 1720. In some embodiments, the RAN node 1714 and/or the RAN node 1716 can fulfill various logical functions for the (R)AN 1708 including, but not limited to, radio network controller (RNC) functions such as radio bearer management, uplink and downlink dynamic radio resource management and data packet scheduling, and mobility management.

In embodiments, the UE 1722 and UE 1720 can be configured to communicate using OFDM communication signals with each other or with the RAN node 1714 and/or the RAN node 1716 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1714 and/or the RAN node 1716 to the UE 1722 and UE 1720, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1722 and UE 1720 and the RAN node 1714 and/or the RAN node 1716 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1722 and UE 1720 and the RAN node 1714 or RAN node 1716 may operate using LAA, eLAA, and/or feLAA mechanisms. In these implementations, the UE 1722 and UE 1720 and the RAN node 1714 or RAN node 1716 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1722 and UE 1720, RAN node 1714 or RAN node 1716, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1722, AP 1712, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1722 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1722 and UE 1720. The PDCCH carries information about the transport format and resource allocations related to the PDSCH channel, among other things. It may also inform the UE 1722 and UE 1720 about the transport format, resource allocation, and HARQ information related to the uplink shared channel. Typically, downlink scheduling (assigning control and shared channel resource blocks to the UE 1720 within a cell) may be performed at any of the RAN node 1714 or RAN node 1716 based on channel quality information fed back from any of the UE 1722 and UE 1720. The downlink resource assignment information may be sent on the PDCCH used for (e.g., assigned to) each of the UE 1722 and UE 1720.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1714 or RAN node 1716 may be configured to communicate with one another via interface 1730. In embodiments where the system 1700 is an LTE system (e.g., when CN 1706 is an EPC), the interface 1730 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1722 from an SeNB for user data; information of PDCP PDUs that were not delivered to a UE 1722; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1700 is a SG or NR system (e.g., when CN 1706 is an SGC), the interface 1730 may be an Xn interface. The Xn interface is defined between two or more RAN nodes (e.g., two or more gNBs and the like) that connect to SGC, between a RAN node 1714 (e.g., a gNB) connecting to SGC and an eNB, and/or between two eNBs connecting to 5GC (e.g., CN 1706). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1722 in a connected mode (e.g., CM-CONNECTED) including functionality to manage the UE mobility for connected mode between one or more RAN node 1714 or RAN node 1716. The mobility support may include context transfer from an old (source) serving RAN node 1714 to new (target) serving RAN node 1716; and control of user plane tunnels between old (source) serving RAN node 1714 to new (target) serving RAN node 1716. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1708 is shown to be communicatively coupled to a core network-in this embodiment, CN 1706. The CN 1706 may comprise one or more network elements 1732, which are configured to offer various data and telecommunications services to customers/subscribers (e.g., users of UE 1722 and UE 1720) who are connected to the CN 1706 via the (R)AN 1708. The components of the CN 1706 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1706 may be referred to as a network slice, and a logical instantiation of a portion of the CN 1706 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1718 may be an element offering applications that use IP bearer resources with the core network (e.g., UMTS PS domain, LTE PS data services, etc.). The application server 1718 can also be configured to support one or more communication services (e.g., VoIP sessions, PTT sessions, group communication sessions, social networking services, etc.) for the UE 1722 and UE 1720 via the EPC. The application server 1718 may communicate with the CN 1706 through an IP communications interface 1736.

In embodiments, the CN 1706 may be an SGC, and the (R)AN 116 may be connected with the CN 1706 via an NG interface 1734. In embodiments, the NG interface 1734 may be split into two parts, an NG user plane (NG-U) interface 1726, which carries traffic data between the RAN node 1714 or RAN node 1716 and a UPF, and the S1 control plane (NG-C) interface 1728, which is a signaling interface between the RAN node 1714 or RAN node 1716 and AMFs.

In embodiments, the CN 1706 may be a SG CN, while in other embodiments, the CN 1706 may be an EPC). Where CN 1706 is an EPC, the (R)AN 116 may be connected with the CN 1706 via an S1 interface 1734. In embodiments, the S1 interface 1734 may be split into two parts, an S1 user plane (S1-U) interface 1726, which carries traffic data between the RAN node 1714 or RAN node 1716 and the S-GW, and the S1-MME interface 1728, which is a signaling interface between the RAN node 1714 or RAN node 1716 and MMEs.

Figure 18:
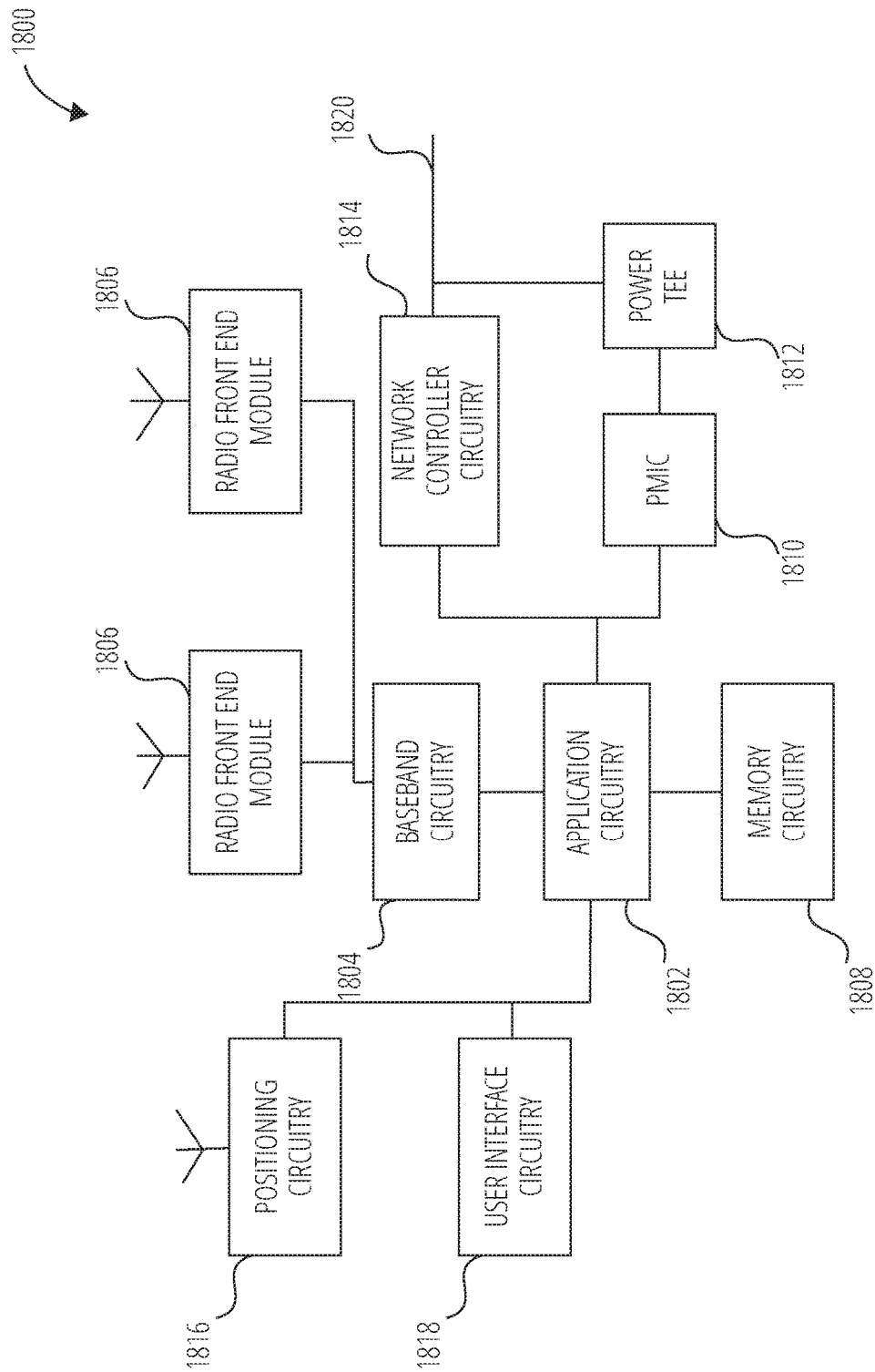
FIG. 18 illustrates an infrastructure equipment in accordance with one embodiment.

FIG. 18 illustrates an example of infrastructure equipment 1800 in accordance with various embodiments. The infrastructure equipment 1800 may be implemented as a base station, radio head, RAN node, AN, application server, and/or any other element/device discussed herein. In other examples, the infrastructure equipment 1800 could be implemented in or by a UE.

The infrastructure equipment 1800 includes application circuitry 1802, baseband circuitry 1804, one or more radio front end module 1806 (RFEM), memory circuitry 1808, power management integrated circuitry (shown as PMIC 1810), power tee circuitry 1812, network controller circuitry 1814, network interface connector 1820, satellite positioning circuitry 1816, and user interface circuitry 1818. In some embodiments, the device infrastructure equipment 1800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1802 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1802 may be coupled with or may include memory/storage elements and may be configured to execute instructions stored in the memory/storage to enable various applications or operating systems to run on the infrastructure equipment 1800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1802 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1802 may comprise, or may be, a special-purpose processor/controller to operate according to the various embodiments herein. As examples, the processor(s) of application circuitry 1802 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1800 may not utilize application circuitry 1802, and instead may include a special-purpose processor/controller to process IP data received from an EPC or 5GC, for example.

In some implementations, the application circuitry 1802 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1802 may comprise logic blocks or logic fabric, and other interconnected resources that may be programmed to perform various functions, such as the procedures, methods, functions, etc. of the various embodiments discussed herein. In such embodiments, the circuitry of application circuitry 1802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1804 may be implemented, for example, as a solder-down substrate including one or more integrated circuits, a single packaged integrated circuit soldered to a main circuit board or a multi-chip module containing two or more integrated circuits.

The user interface circuitry 1818 may include one or more user interfaces designed to enable user interaction with the infrastructure equipment 1800 or peripheral component interfaces designed to enable peripheral component interaction with the infrastructure equipment 1800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1806, which incorporates both mmWave antennas and sub-mmWave.

The memory circuitry 1808 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1808 may be implemented as one or more of solder down packaged integrated circuits, socketed memory modules and plug-in memory cards.

The PMIC 1810 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1812 may provide for electrical power drawn from a network cable to provide both power supply and data connectivity to the infrastructure equipment 1800 using a single cable.

The network controller circuitry 1814 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1800 via network interface connector 1820 using a physical connection, which may be electrical (commonly referred to as a "copper interconnect"), optical, or wireless. The network controller circuitry 1814 may include one or more dedicated processors and/or FPGAs to communicate using one or more of the aforementioned protocols. In some implementations, the network controller circuitry 1814 may include multiple controllers to provide connectivity to other networks using the same or different protocols.

The positioning circuitry 1816 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1816 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1816 may include a Micro-Technology for Positioning, Navigation, and Timing (Micro-PNT) IC that uses a master timing clock to perform position tracking/estimation without GNSS assistance. The positioning circuitry 1816 may also be part of, or interact with, the baseband circuitry 1804 and/or radio front end module 1806 to communicate with the nodes and components of the positioning network. The positioning circuitry 1816 may also provide position data and/or time data to the application circuitry 1802, which may use the data to synchronize operations with various infrastructure, or the like. The components shown by FIG. 18 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I2C interface, an SPI interface, point to point interfaces, and a power bus, among others.

Figure 19:
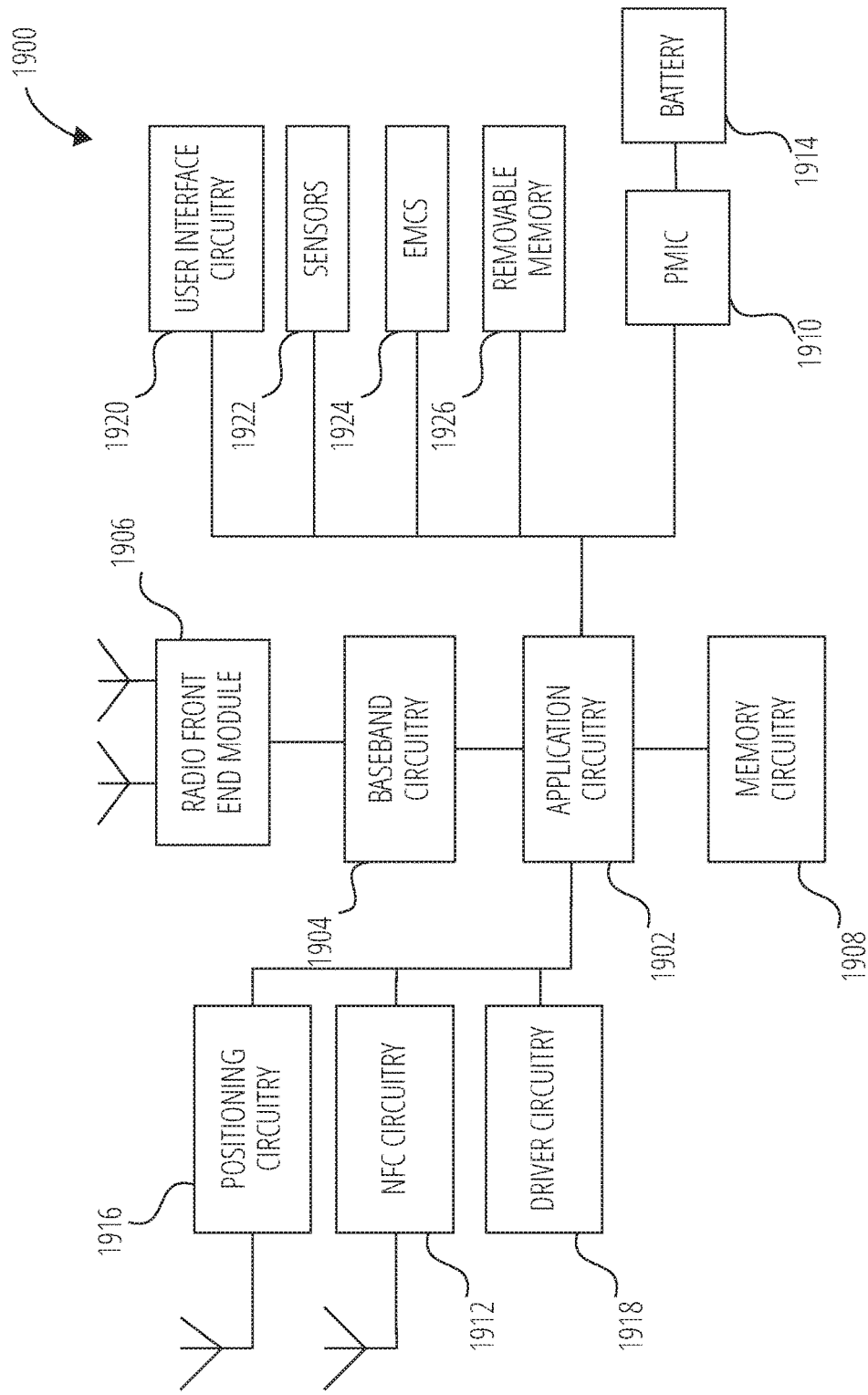
FIG. 19 illustrates a platform in accordance with one embodiment.

FIG. 19 illustrates an example of a platform 1900 in accordance with various embodiments. In embodiments, the computer platform 1900 may be suitable for use as UEs, application servers, and/or any other element/device discussed herein. The platform 1900 may include any combinations of the components shown in the example. The components of platform 1900 may be implemented as integrated circuits (ICs), portions thereof, discrete electronic devices, or other modules, logic, hardware, software, firmware, or a combination thereof adapted in the computer platform 1900, or as components otherwise incorporated within a chassis of a larger system. The block diagram of FIG. 19 is intended to show a high level view of components of the computer platform 1900. However, some of the components shown may be omitted, additional components may be present, and different arrangement of the components shown may occur in other implementations.

Application circuitry 1902 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1902 may be coupled with or may include memory/storage elements and may be configured to execute instructions stored in the memory/storage to enable various applications or operating systems to run on the platform 1900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1902 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1902 may comprise, or may be, a special-purpose processor/controller to operate according to the various embodiments herein.

As examples, the processor(s) of application circuitry 1902 may include an Intel® Architecture Core™ based processor, such as a Quark™, an Atom™, an i3, an i5, an i7, or an MCU-class processor, or another such processor available from Intel® Corporation. The processors of the application circuitry 1902 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1902 may be a part of a system on a chip (SoC) in which the application circuitry 1902 and other components are formed into a single integrated circuit, or a single package, such as the Edison™ or Galileo™ SoC boards from Intel® Corporation.

Additionally or alternatively, application circuitry 1902 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1902 may comprise logic blocks or logic fabric, and other interconnected resources that may be programmed to perform various functions, such as the procedures, methods, functions, etc. of the various embodiments discussed herein. In such embodiments, the circuitry of application circuitry 1902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1904 may be implemented, for example, as a solder-down substrate including one or more integrated circuits, a single packaged integrated circuit soldered to a main circuit board or a multi-chip module containing two or more integrated circuits.

The radio front end module 1906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1906, which incorporates both mmWave antennas and sub-mmWave.

The memory circuitry 1908 may include any number and type of memory devices used to provide for a given amount of system memory. As examples, the memory circuitry 1908 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1908 may be developed in accordance with a Joint Electron Devices Engineering Council (JEDEC) low power double data rate (LPDDR)-based design, such as LPDDR2, LPDDR3, LPDDR4, or the like. Memory circuitry 1908 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1908 maybe on-die memory or registers associated with the application circuitry 1902. To provide for persistent storage of information such as data, applications, operating systems and so forth, memory circuitry 1908 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1900 may incorporate the three-dimensional (3D) cross-point (XPOINT) memories from Intel® and Micron®.

The removable memory 1926 may include devices, circuitry, enclosures/housings, ports or receptacles, etc. used to couple portable data storage devices with the platform 1900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1900 may also include interface circuitry (not shown) that is used to connect external devices with the platform 1900. The external devices connected to the platform 1900 via the interface circuitry include sensors 1922 and electro-mechanical components (shown as EMCs 1924), as well as removable memory devices coupled to removable memory 1926.

The sensors 1922 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1924 include devices, modules, or subsystems whose purpose is to enable platform 1900 to change its state, position, and/or orientation, or move or control a mechanism or (sub)system. Additionally, EMCs 1924 may be configured to generate and send messages/signaling to other components of the platform 1900 to indicate a current state of the EMCs 1924. Examples of the EMCs 1924 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1900 is configured to operate one or more EMCs 1924 based on one or more captured events and/or instructions or control signals received from a service provider and/or various clients. In some implementations, the interface circuitry may connect the platform 1900 with positioning circuitry 1916. The positioning circuitry 1916 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1916 may include a Micro-PNT IC that uses a master timing clock to perform position tracking/estimation without GNSS assistance. The positioning circuitry 1916 may also be part of, or interact with, the baseband circuitry 1904 and/or radio front end module 1906 to communicate with the nodes and components of the positioning network. The positioning circuitry 1916 may also provide position data and/or time data to the application circuitry 1902, which may use the data to synchronize operations with various infrastructure (e.g., radio base stations), for turn-by-turn navigation applications, or the like.

In some implementations, the interface circuitry may connect the platform 1900 with Near-Field Communication circuitry (shown as NFC circuitry 1912). The NFC circuitry 1912 is configured to provide contactless, short-range communications based on radio frequency identification (RFID) standards, wherein magnetic field induction is used to enable communication between NFC circuitry 1912 and NFC-enabled devices external to the platform 1900 (e.g., an "NFC touchpoint"). NFC circuitry 1912 comprises an NFC controller coupled with an antenna element and a processor coupled with the NFC controller. The NFC controller may be a chip/IC providing NFC functionalities to the NFC circuitry 1912 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1912, or initiate data transfer between the NFC circuitry 1912 and another active NFC device (e.g., a smartphone or an NFC-enabled POS terminal) that is proximate to the platform 1900.

The driver circuitry 1918 may include software and hardware elements that operate to control particular devices that are embedded in the platform 1900, attached to the platform 1900, or otherwise communicatively coupled with the platform 1900. The driver circuitry 1918 may include individual drivers allowing other components of the platform 1900 to interact with or control various input/output (I/O) devices that may be present within, or connected to, the platform 1900. For example, driver circuitry 1918 may include a display driver to control and allow access to a display device, a touchscreen driver to control and allow access to a touchscreen interface of the platform 1900, sensor drivers to obtain sensor readings of sensors 1922 and control and allow access to sensors 1922, EMC drivers to obtain actuator positions of the EMCs 1924 and/or control and allow access to the EMCs 1924, a camera driver to control and allow access to an embedded image capture device, audio drivers to control and allow access to one or more audio devices.

The power management integrated circuitry (shown as PMIC 1910) (also referred to as "power management circuitry") may manage power provided to various components of the platform 1900. In particular, with respect to the baseband circuitry 1904, the PMIC 1910 may control power-source selection, voltage scaling, battery charging, or DC-to-DC conversion. The PMIC 1910 may often be included when the platform 1900 is capable of being powered by a battery 1914, for example, when the device is included in a UE.

In some embodiments, the PMIC 1910 may control, or otherwise be part of, various power saving mechanisms of the platform 1900. For example, if the platform 1900 is in an RRC_Connected state, where it is still connected to the RAN node as it expects to receive traffic shortly, then it may enter a state known as Discontinuous Reception Mode (DRX) after a period of inactivity. During this state, the platform 1900 may power down for brief intervals of time and thus save power. If there is no data traffic activity for an extended period of time, then the platform 1900 may transition off to an RRC_Idle state, where it disconnects from the network and does not perform operations such as channel quality feedback, handover, etc. The platform 1900 goes into a very low power state and it performs paging where again it periodically wakes up to listen to the network and then powers down again. The platform 1900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1914 may power the platform 1900, although in some examples the platform 1900 may be mounted deployed in a fixed location, and may have a power supply coupled to an electrical grid. The battery 1914 may be a lithium ion battery, a metal-air battery, such as a zinc-air battery, an aluminum-air battery, a lithium-air battery, and the like. In some implementations, such as in V2X applications, the battery 1914 may be a typical lead-acid automotive battery.

In some implementations, the battery 1914 may be a "smart battery," which includes or is coupled with a Battery Management System (BMS) or battery monitoring integrated circuitry. The BMS may be included in the platform 1900 to track the state of charge (SoCh) of the battery 1914. The BMS may be used to monitor other parameters of the battery 1914 to provide failure predictions, such as the state of health (SoH) and the state of function (SoF) of the battery 1914. The BMS may communicate the information of the battery 1914 to the application circuitry 1902 or other components of the platform 1900. The BMS may also include an analog-to-digital (ADC) convertor that allows the application circuitry 1902 to directly monitor the voltage of the battery 1914 or the current flow from the battery 1914. The battery parameters may be used to determine actions that the platform 1900 may perform, such as transmission frequency, network operation, sensing frequency, and the like.

A power block, or other power supply coupled to an electrical grid may be coupled with the BMS to charge the battery 1914. In some examples, the power block may be replaced with a wireless power receiver to obtain the power wirelessly, for example, through a loop antenna in the computer platform 1900. In these examples, a wireless battery charging circuit may be included in the BMS. The specific charging circuits chosen may depend on the size of the battery 1914, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1920 includes various input/output (I/O) devices present within, or connected to, the platform 1900, and includes one or more user interfaces designed to enable user interaction with the platform 1900 and/or peripheral component interfaces designed to enable peripheral component interaction with the platform 1900. The user interface circuitry 1920 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1900. The output device circuitry may also include speakers or other audio emitting devices, printer(s), and/or the like. In some embodiments, the sensors 1922 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1900 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 20:
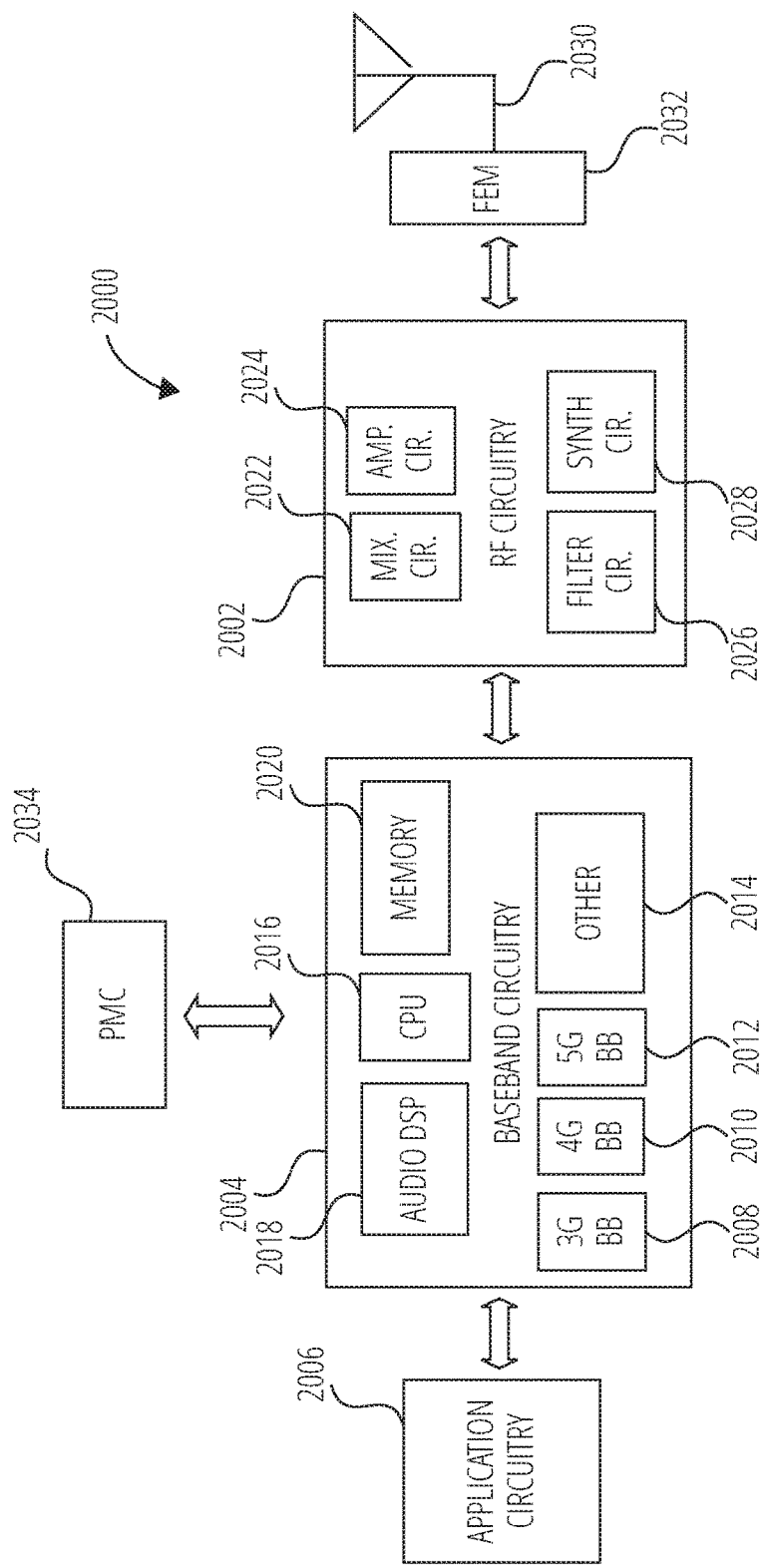
FIG. 20 illustrates a device in accordance with one embodiment.

FIG. 20 illustrates example components of a device 2000 in accordance with some embodiments. In some embodiments, the device 2000 may include application circuitry 2006, baseband circuitry 2004, Radio Frequency (RF) circuitry (shown as RF circuitry 2002), front-end module (FEM) circuitry (shown as FEM circuitry 2032), one or more antennas 2030, and power management circuitry (PMC) (shown as PMC 2034) coupled together at least as shown. The components of the illustrated device 2000 may be included in a UE or a RAN node. In some embodiments, the device 2000 may include fewer elements (e.g., a RAN node may not utilize application circuitry 2006, and instead include a processor/controller to process IP data received from an EPC). In some embodiments, the device 2000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2006 may include one or more application processors. For example, the application circuitry 2006 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2000. In some embodiments, processors of application circuitry 2006 may process IP data packets received from an EPC.

The baseband circuitry 2004 may include circuitry such as, but not limited to, one or more single-core or multi-core processors. The baseband circuitry 2004 may include one or more baseband processors or control logic to process baseband signals received from a receive signal path of the RF circuitry 2002 and to generate baseband signals for a transmit signal path of the RF circuitry 2002. The baseband circuitry 2004 may interface with the application circuitry 2006 for generation and processing of the baseband signals and for controlling operations of the RF circuitry 2002. For example, in some embodiments, the baseband circuitry 2004 may include a third generation (3G) baseband processor (3G baseband processor 2008), a fourth generation (4G) baseband processor (4G baseband processor 2010), a fifth generation (5G) baseband processor (5G baseband processor 2012), or other baseband processor(s) 2014 for other existing generations, generations in development or to be developed in the future (e.g., second generation (2G), sixth generation (6G), etc.). The baseband circuitry 2004 (e.g., one or more of baseband processors) may handle various radio control functions that enable communication with one or more radio networks via the RF circuitry 2002. In other embodiments, some or all of the functionality of the illustrated baseband processors may be included in modules stored in the memory 2020 and executed via a Central Processing Unit (CPU 2016). The radio control functions may include, but are not limited to, signal modulation/demodulation, encoding/decoding, radio frequency shifting, etc. In some embodiments, modulation/demodulation circuitry of the baseband circuitry 2004 may include Fast-Fourier Transform (FFT), precoding, or constellation mapping/demapping functionality. In some embodiments, encoding/decoding circuitry of the baseband circuitry 2004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2004 may include a digital signal processor (DSP), such as one or more audio DSP(s) 2018. The one or more audio DSP(s) 2018 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2004 and the application circuitry 2006 may be implemented together such as, for example, on a system on a chip (SOC).

In some embodiments, the baseband circuitry 2004 may provide for communication compatible with one or more radio technologies. For example, in some embodiments, the baseband circuitry 2004 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 2004 is configured to support radio communications of more than one wireless protocol may be referred to as multi-mode baseband circuitry.

The RF circuitry 2002 may enable communication with wireless networks using modulated electromagnetic radiation through a non-solid medium. In various embodiments, the RF circuitry 2002 may include switches, filters, amplifiers, etc. to facilitate the communication with the wireless network. The RF circuitry 2002 may include a receive signal path which may include circuitry to down-convert RF signals received from the FEM circuitry 2032 and provide baseband signals to the baseband circuitry 2004. The RF circuitry 2002 may also include a transmit signal path which may include circuitry to up-convert baseband signals provided by the baseband circuitry 2004 and provide RF output signals to the FEM circuitry 2032 for transmission.

In some embodiments, the receive signal path of the RF circuitry 2002 may include mixer circuitry 2022, amplifier circuitry 2024 and filter circuitry 2026. In some embodiments, the transmit signal path of the RF circuitry 2002 may include filter circuitry 2026 and mixer circuitry 2022. The RF circuitry 2002 may also include synthesizer circuitry 2028 for synthesizing a frequency for use by the mixer circuitry 2022 of the receive signal path and the transmit signal path. In some embodiments, the mixer circuitry 2022 of the receive signal path may be configured to down-convert RF signals received from the FEM circuitry 2032 based on the synthesized frequency provided by synthesizer circuitry 2028. The amplifier circuitry 2024 may be configured to amplify the down-converted signals and the filter circuitry 2026 may be a low-pass filter (LPF) or band-pass filter (BPF) configured to remove unwanted signals from the down-converted signals to generate output baseband signals. Output baseband signals may be provided to the baseband circuitry 2004 for further processing. In some embodiments, the output baseband signals may be zero-frequency baseband signals, although this is not a requirement. In some embodiments, the mixer circuitry 2022 of the receive signal path may comprise passive mixers, although the scope of the embodiments is not limited in this respect.

In some embodiments, the mixer circuitry 2022 of the transmit signal path may be configured to up-convert input baseband signals based on the synthesized frequency provided by the synthesizer circuitry 2028 to generate RF output signals for the FEM circuitry 2032. The baseband signals may be provided by the baseband circuitry 2004 and may be filtered by the filter circuitry 2026.

In some embodiments, the mixer circuitry 2022 of the receive signal path and the mixer circuitry 2022 of the transmit signal path may include two or more mixers and may be arranged for quadrature downconversion and upconversion, respectively. In some embodiments, the mixer circuitry 2022 of the receive signal path and the mixer circuitry 2022 of the transmit signal path may include two or more mixers and may be arranged for image rejection (e.g., Hartley image rejection). In some embodiments, the mixer circuitry 2022 of the receive signal path and the mixer circuitry 2022 may be arranged for direct downconversion and direct upconversion, respectively. In some embodiments, the mixer circuitry 2022 of the receive signal path and the mixer circuitry 2022 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2002 may include analog-to-digital converter (ADC) and digital-to-analog converter (DAC) circuitry and the baseband circuitry 2004 may include a digital baseband interface to communicate with the RF circuitry 2002.

In some dual-mode embodiments, a separate radio IC circuitry may be provided for processing signals for each spectrum, although the scope of the embodiments is not limited in this respect.

In some embodiments, the synthesizer circuitry 2028 may be a fractional-N synthesizer or a fractional N/N+1 synthesizer, although the scope of the embodiments is not limited in this respect as other types of frequency synthesizers may be suitable. For example, synthesizer circuitry 2028 may be a delta-sigma synthesizer, a frequency multiplier, or a synthesizer comprising a phase-locked loop with a frequency divider.

The synthesizer circuitry 2028 may be configured to synthesize an output frequency for use by the mixer circuitry 2022 of the RF circuitry 2002 based on a frequency input and a divider control input. In some embodiments, the synthesizer circuitry 2028 may be a fractional N/N+1 synthesizer.

In some embodiments, frequency input may be provided by a voltage controlled oscillator (VCO), although that is not a requirement. Divider control input may be provided by either the baseband circuitry 2004 or the application circuitry 2006 (such as an applications processor) depending on the desired output frequency. In some embodiments, a divider control input (e.g., N) may be determined from a look-up table based on a channel indicated by the application circuitry 2006.

Synthesizer circuitry 2028 of the RF circuitry 2002 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 2028 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2002 may include an IQ/polar converter.

The FEM circuitry 2032 may include a receive signal path which may include circuitry configured to operate on RF signals received from one or more antennas 2030, amplify the received signals and provide the amplified versions of the received signals to the RF circuitry 2002 for further processing. The FEM circuitry 2032 may also include a transmit signal path which may include circuitry configured to amplify signals for transmission provided by the RF circuitry 2002 for transmission by one or more of the one or more antennas 2030. In various embodiments, the amplification through the transmit or receive signal paths may be done solely in the RF circuitry 2002, solely in the FEM circuitry 2032, or in both the RF circuitry 2002 and the FEM circuitry 2032.

In some embodiments, the FEM circuitry 2032 may include a TX/RX switch to switch between transmit mode and receive mode operation. The FEM circuitry 2032 may include a receive signal path and a transmit signal path. The receive signal path of the FEM circuitry 2032 may include an LNA to amplify received RF signals and provide the amplified received RF signals as an output (e.g., to the RF circuitry 2002). The transmit signal path of the FEM circuitry 2032 may include a power amplifier (PA) to amplify input RF signals (e.g., provided by the RF circuitry 2002), and one or more filters to generate RF signals for subsequent transmission (e.g., by one or more of the one or more antennas 2030).

In some embodiments, the PMC 2034 may manage power provided to the baseband circuitry 2004. In particular, the PMC 2034 may control power-source selection, voltage scaling, battery charging, or DC-to-DC conversion. The PMC 2034 may often be included when the device 2000 is capable of being powered by a battery, for example, when the device 2000 is included in a UE. The PMC 2034 may increase the power conversion efficiency while providing desirable implementation size and heat dissipation characteristics.

FIG. 20 shows the PMC 2034 coupled only with the baseband circuitry 2004. However, in other embodiments, the PMC 2034 may be additionally or alternatively coupled with, and perform similar power management operations for, other components such as, but not limited to, the application circuitry 2006, the RF circuitry 2002, or the FEM circuitry 2032.

In some embodiments, the PMC 2034 may control, or otherwise be part of, various power saving mechanisms of the device 2000. For example, if the device 2000 is in an RRC_Connected state, where it is still connected to the RAN node as it expects to receive traffic shortly, then it may enter a state known as Discontinuous Reception Mode (DRX) after a period of inactivity. During this state, the device 2000 may power down for brief intervals of time and thus save power.

If there is no data traffic activity for an extended period of time, then the device 2000 may transition off to an RRC_Idle state, where it disconnects from the network and does not perform operations such as channel quality feedback, handover, etc. The device 2000 goes into a very low power state and it performs paging where again it periodically wakes up to listen to the network and then powers down again. The device 2000 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2006 and processors of the baseband circuitry 2004 may be used to execute elements of one or more instances of a protocol stack. For example, processors of the baseband circuitry 2004, alone or in combination, may be used to execute Layer 3, Layer 2, or Layer 1 functionality, while processors of the application circuitry 2006 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 21:
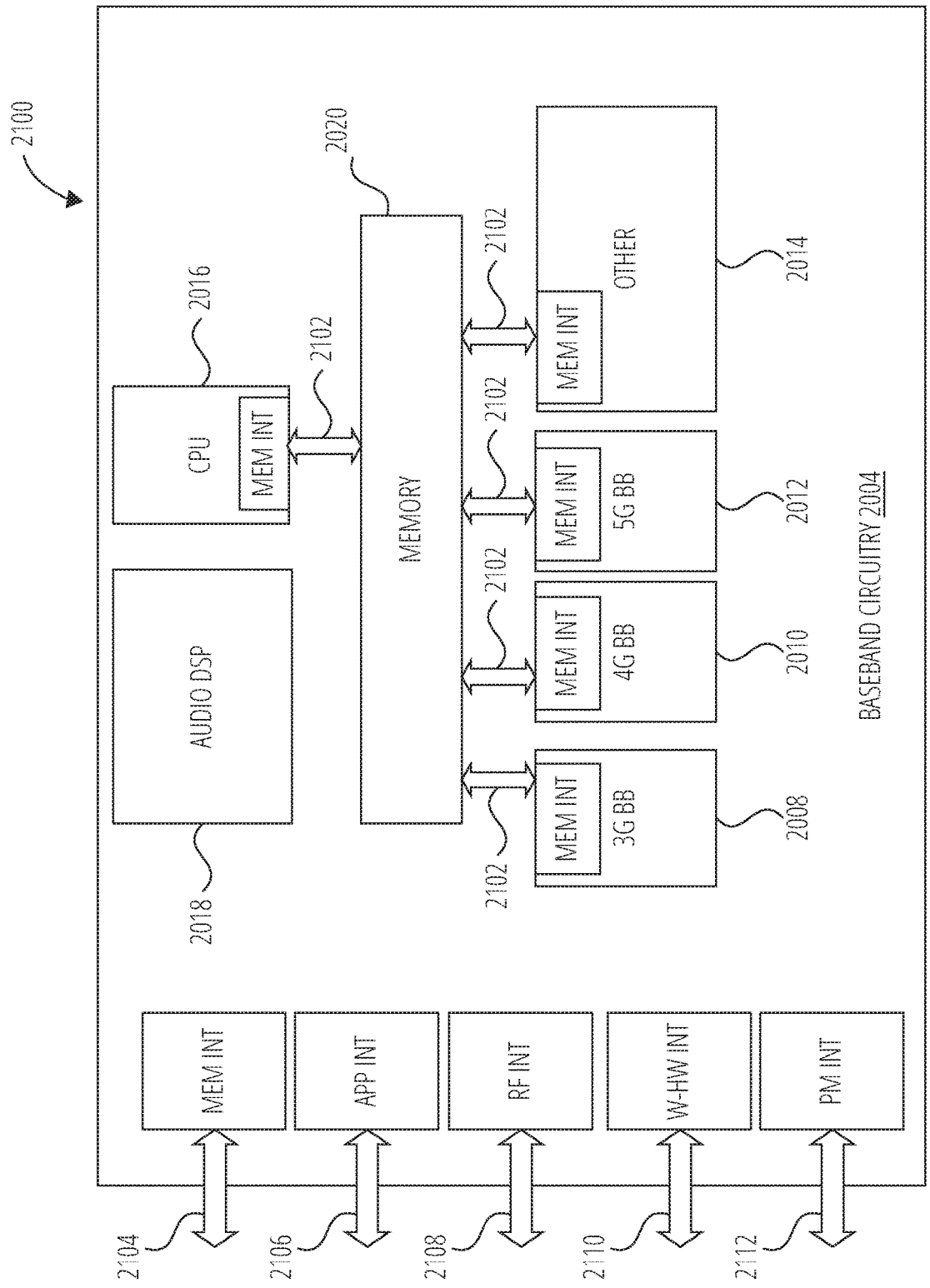
FIG. 21 illustrates example interfaces in accordance with one embodiment.

FIG. 21 illustrates example interfaces 2100 of baseband circuitry in accordance with some embodiments. As discussed above, the baseband circuitry 2004 of FIG. 20 may comprise 3G baseband processor 2008, 4G baseband processor 2010, 5G baseband processor 2012, other baseband processor(s) 2014, CPU 2016, and a memory 2020 utilized by said processors. As illustrated, each of the processors may include a respective memory interface 2102 to send/receive data to/from the memory 2020.

The baseband circuitry 2004 may further include one or more interfaces to communicatively couple to other circuitries/devices, such as a memory interface 2104 (e.g., an interface to send/receive data to/from memory external to the baseband circuitry 2004), an application circuitry interface 2106 (e.g., an interface to send/receive data to/from the application circuitry 2006 of FIG. 20), an RF circuitry interface 2108 (e.g., an interface to send/receive data to/from RF circuitry 2002 of FIG. 20), a wireless hardware connectivity interface 2110 (e.g., an interface to send/receive data to/from Near Field Communication (NFC) components, Bluetooth® components (e.g., Bluetooth® Low Energy), Wi-Fi® components, and other communication components), and a power management interface 2112 (e.g., an interface to send/receive power or control signals to/from the PMC 2034.

Figure 22:
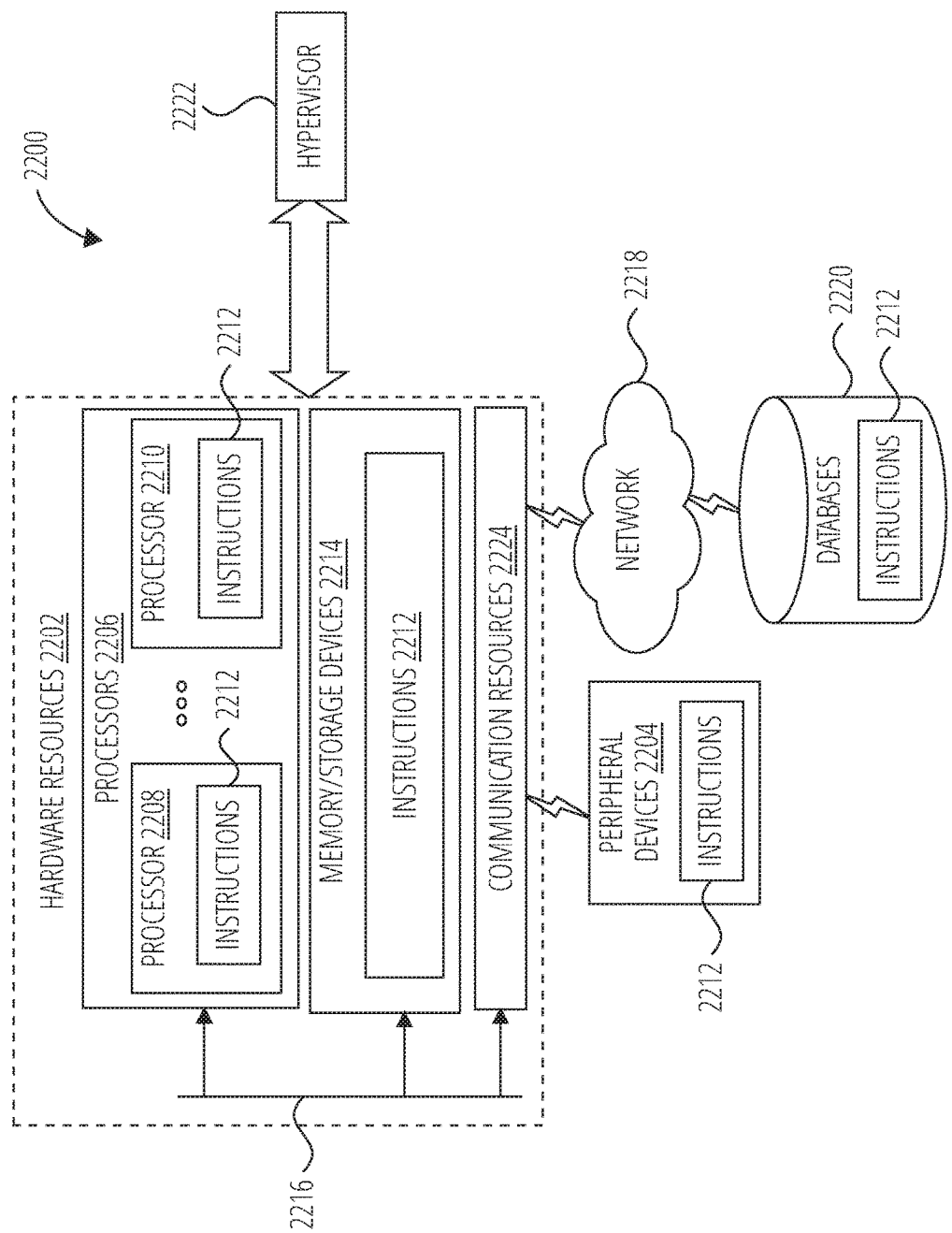
FIG. 22 illustrates components in accordance with one embodiment.

FIG. 22 is a block diagram illustrating components 2200, according to some example embodiments, able to read instructions from a machine-readable or computer-readable medium (e.g., a non-transitory machine-readable storage medium) and perform any one or more of the methodologies discussed herein. Specifically, FIG. 22 shows a diagrammatic representation of hardware resources 2202 including one or more processors 2206 (or processor cores), one or more memory/storage devices 2214, and one or more communication resources 2224, each of which may be communicatively coupled via a bus 2216. For embodiments where node virtualization (e.g., NFV) is utilized, a hypervisor 2222 may be executed to provide an execution environment for one or more network slices/sub-slices to utilize the hardware resources 2202.

The processors 2206 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2208 and a processor 2210.

The memory/storage devices 2214 may include main memory, disk storage, or any suitable combination thereof. The memory/storage devices 2214 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2224 may include interconnection or network interface components or other suitable devices to communicate with one or more peripheral devices 2204 or one or more databases 2220 via a network 2218. For example, the communication resources 2224 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2212 may comprise software, a program, an application, an applet, an app, or other executable code for causing at least any of the processors 2206 to perform any one or more of the methodologies discussed herein. The instructions 2212 may reside, completely or partially, within at least one of the processors 2206 (e.g., within the processor's cache memory), the memory/storage devices 2214, or any suitable combination thereof. Furthermore, any portion of the instructions 2212 may be transferred to the hardware resources 2202 from any combination of the peripheral devices 2204 or the databases 2220. Accordingly, the memory of the processors 2206, the memory/storage devices 2214, the peripheral devices 2204, and the databases 2220 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a UE, the method comprising:
   receiving a scheduling downlink control information (DCI) message, the DCI message including a skipping indication;
   determining a time to apply skipping for physical downlink control channel (PDCCH) monitoring as a result of the skipping indication; and
   applying the skipping for the PDCCH for a preconfigured number of slots at the determined time, wherein for downlink communication, the skipping is applied based on an acknowledgement (ACK) message or a negative-acknowledgement (NACK), wherein when the ACK message is transmitted, the skipping is applied after the ACK, and when the NACK message is transmitted, the skipping is applied after a drx-HARQRTTTimerDL.

2. The method of claim 1, wherein the skipping is applied after the scheduling DCI is received and processed.

3. The method of claim 1, wherein for uplink communication, the skipping is applied when drx-HARQRTTTimerUL expires.

4. The method of claim 1, wherein for uplink communication, the skipping is applied right after a PSUCH transmission finishes.

5. The method of claim 1, further comprising monitoring a drx-retransmissionTimerUL, and wherein the skipping is applied after the drx-retransmissionTimerUL expires.

6. The method of claim 1, further comprising:
   waking after skipping a preconfigured number of slots;
   monitoring the PDCCH for a period of time; and
   if no scheduling DCI is received, skipping another pre-configured number of slots.

7. The method of claim 1, further comprising receiving a non-schedule DCI comprising a skip indication field indicating whether the UE should apply PDCCH monitoring skipping for another pre-configured number of slots.

8. A method for a network node, the method comprising:
   configuring a scheduling downlink control information (DCI) message, the DCI message including a skipping indication;
   transmitting the scheduling DCI to a UE;
   determining a time that the UE will apply skipping for physical downlink control channel (PDCCH) monitoring as a result of the skipping indication;
   limiting PDCCH transmission for a preconfigured number of slots at the determined time; and
   reducing a size of a next scheduling DCI based on which UEs are to be monitoring PDCCH according to the non-scheduling DCI.

9. The method of claim 8, further comprising sending a non-scheduling DCI comprising a skip indication field indicating whether the UE should apply PDCCH monitoring skipping for another pre-configured number of slots.

10. The method of claim 9, wherein the non-scheduling DCI is UE specific.

11. The method of claim 9, wherein the non-scheduling DCI is group based.

12. A user equipment (UE) comprising:
    a baseband processing unit; and
    a memory storing instructions that when executed by the baseband processing unit cause the UE to:
    process a downlink control information (DCI);
    determine a PDCCH monitoring behavior indicated by the DCI;
    determine when to apply the PDCCH monitoring behavior; and
    apply the PDCCH monitoring behavior, wherein for uplink communication, the PDCCH monitoring behavior indicated by the DCI is applied when drx-HARQRTTTimerUL expires.

13. The UE of claim 12, wherein the DCI comprises a skipping indicator to cause the PDCCH monitoring behavior to apply PDCCH monitoring skipping.

14. The UE of claim 12, wherein the DCI comprises a PDCCH monitor pattern indication to cause a search space or coreset change.

15. The UE of claim 14, for downlink communication, the PDCCH monitor pattern is applied after one of DCI processing, drx-HARQRTTtimerDL expiring, or after ACK message.

* * * * *